Feb. 11, 1941. P. A. NOXON ET AL 2,231,215
TELEGRAPH PRINTER
Filed March 3, 1936 12 Sheets-Sheet 2

INVENTORS
P.A. NOXON
S.W. ROTHERMEL
F.J. MAUS
E.J. SORTORE
BY Eugene C. Brown
ATTORNEY

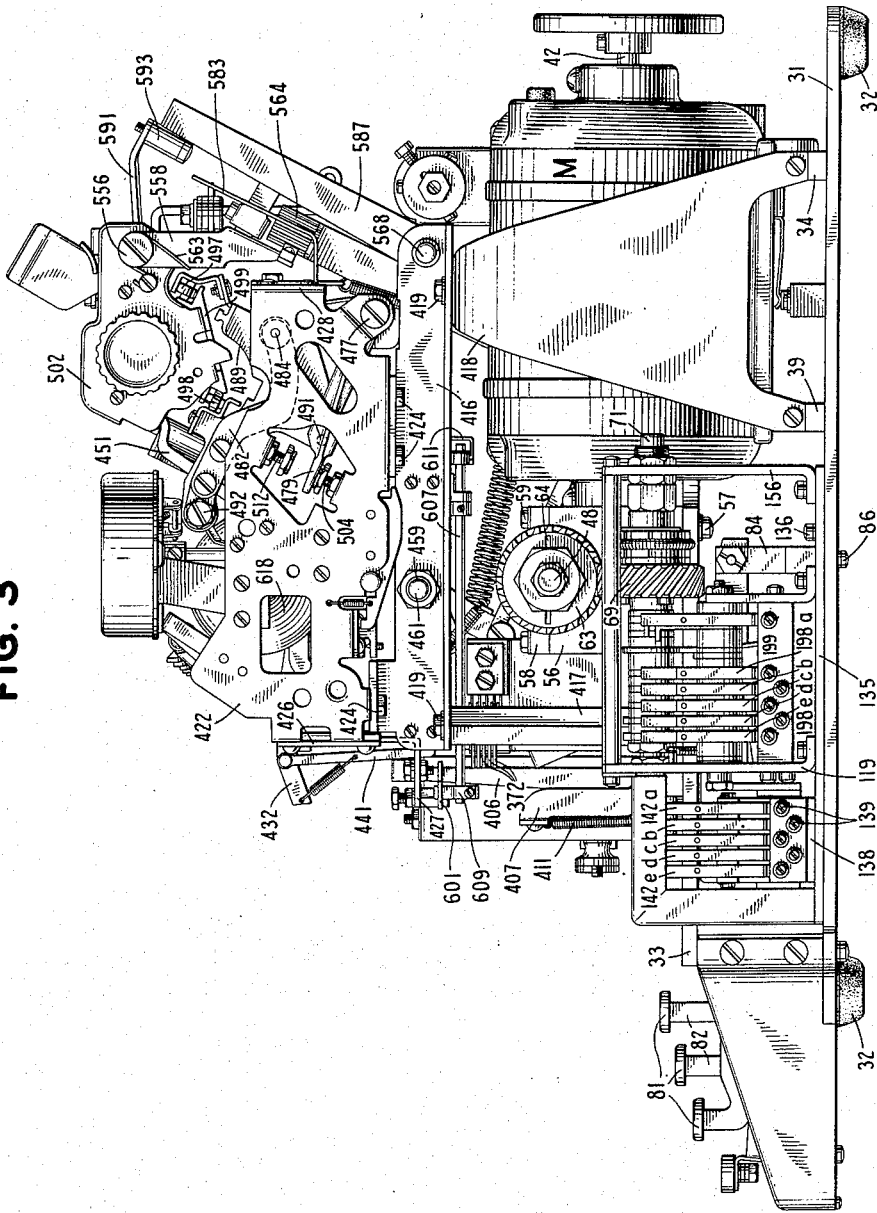

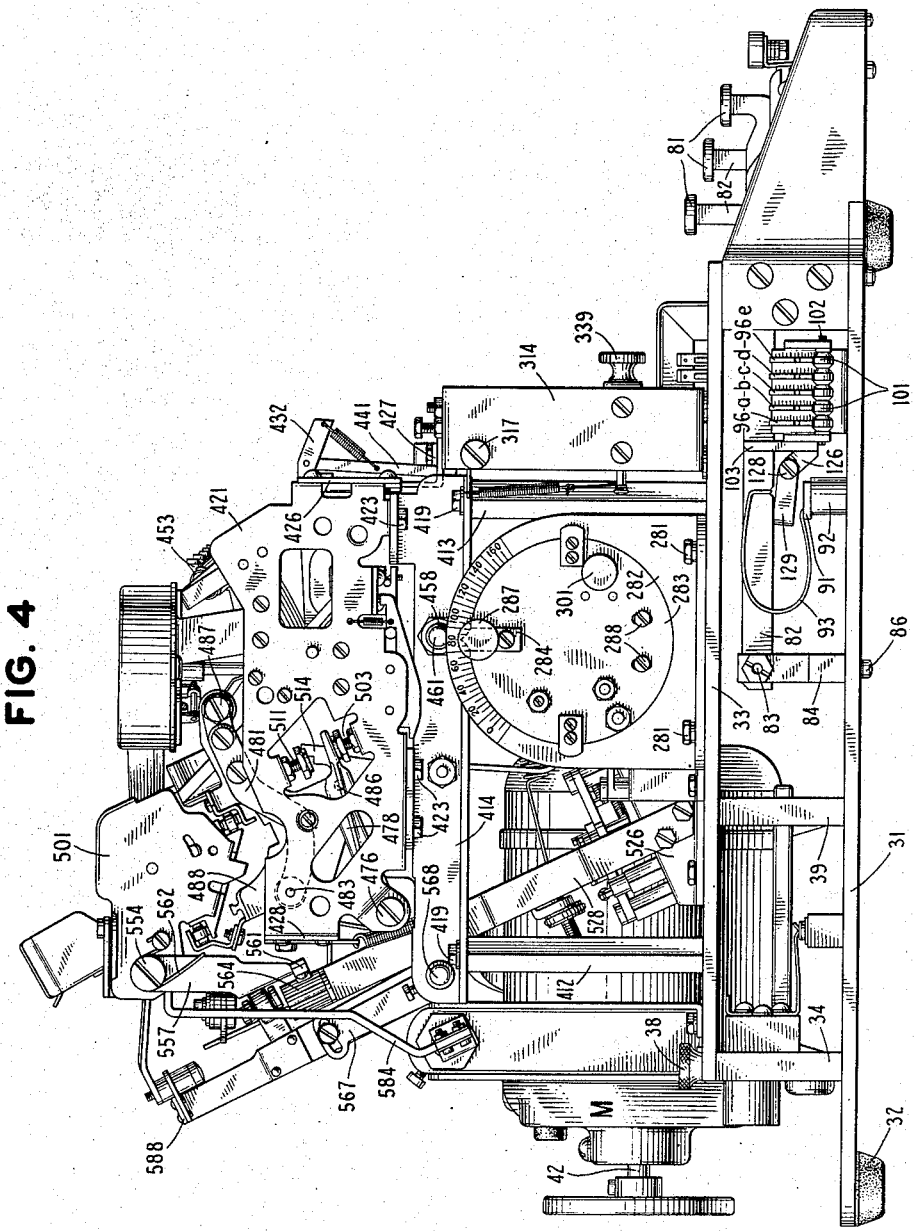

Feb. 11, 1941.   P. A. NOXON ET AL   2,231,215
TELEGRAPH PRINTER
Filed March 3, 1936   12 Sheets-Sheet 6
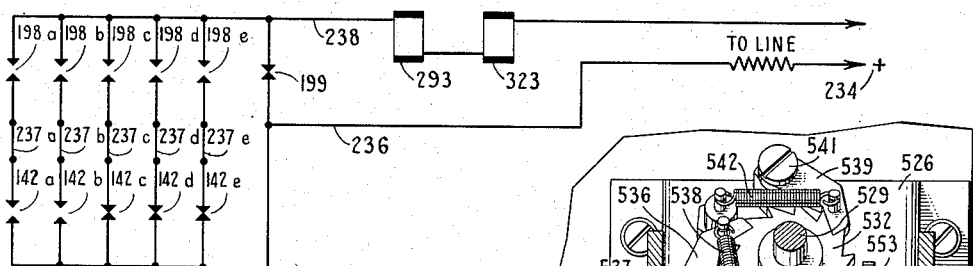
FIG. 28
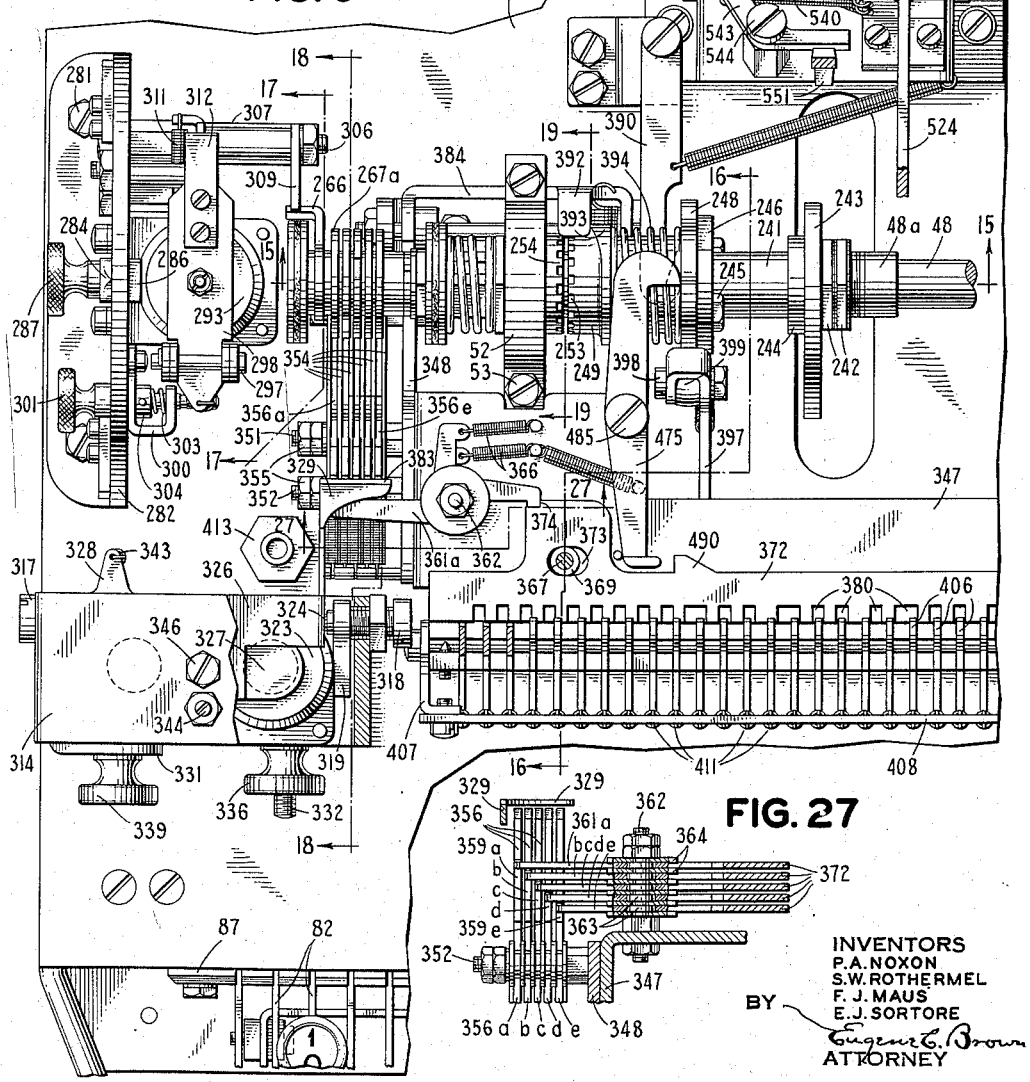
FIG. 6
FIG. 27
INVENTORS
P.A. NOXON
S.W. ROTHERMEL
F.J. MAUS
E.J. SORTORE
BY Eugene C. Brown
ATTORNEY Feb. 11, 1941. P. A. NOXON ET AL 2,231,215
TELEGRAPH PRINTER
Filed March 3, 1936 12 Sheets-Sheet 7
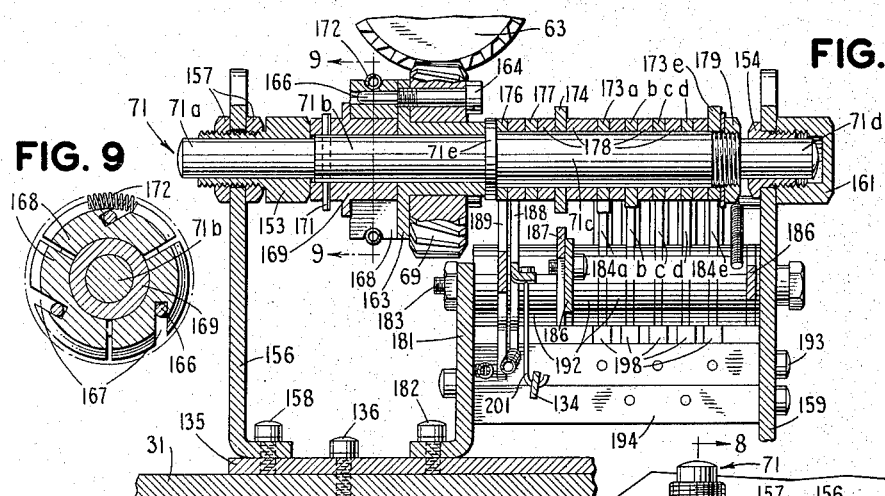
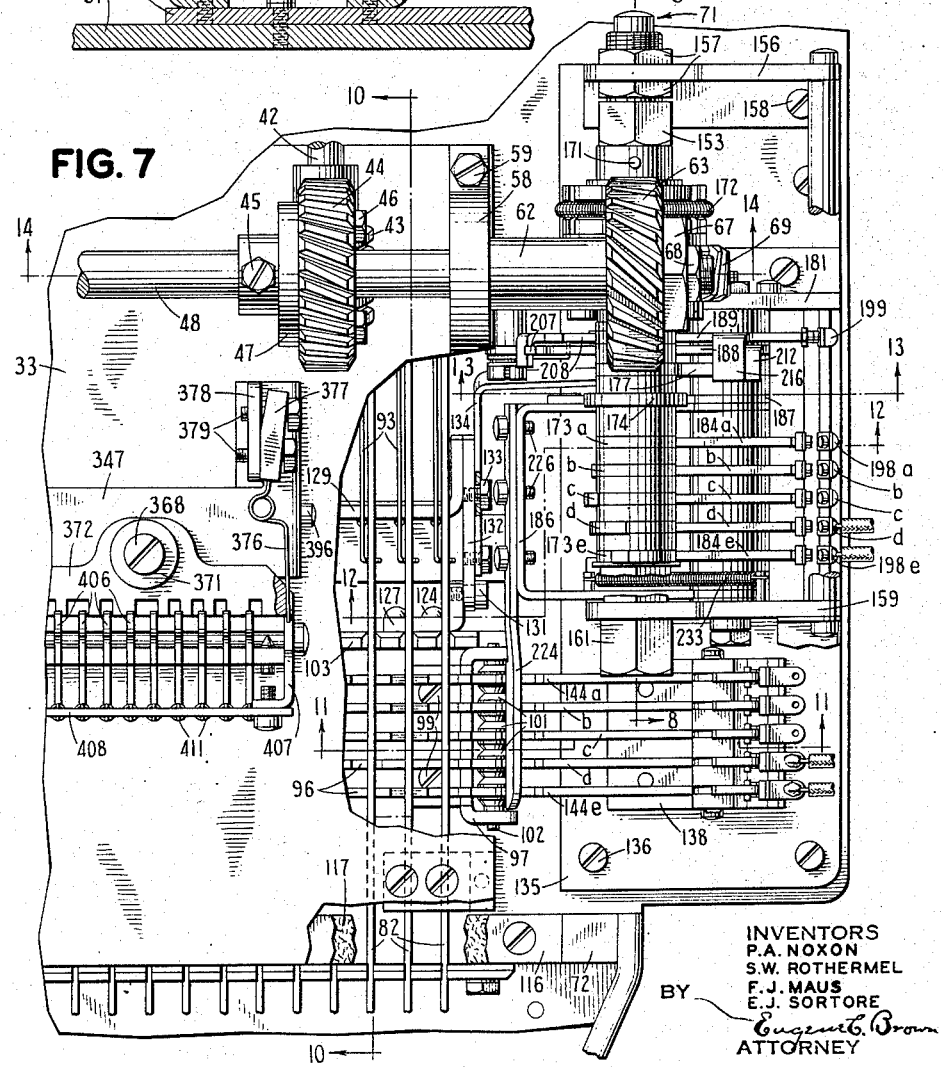
INVENTORS
P. A. NOXON
S. W. ROTHERMEL
F. J. MAUS
E. J. SORTORE
BY Eugene C. Brown
ATTORNEY Feb. 11, 1941.   P. A. NOXON ET AL   2,231,215
TELEGRAPH PRINTER
Filed March 3, 1936    12 Sheets-Sheet 8
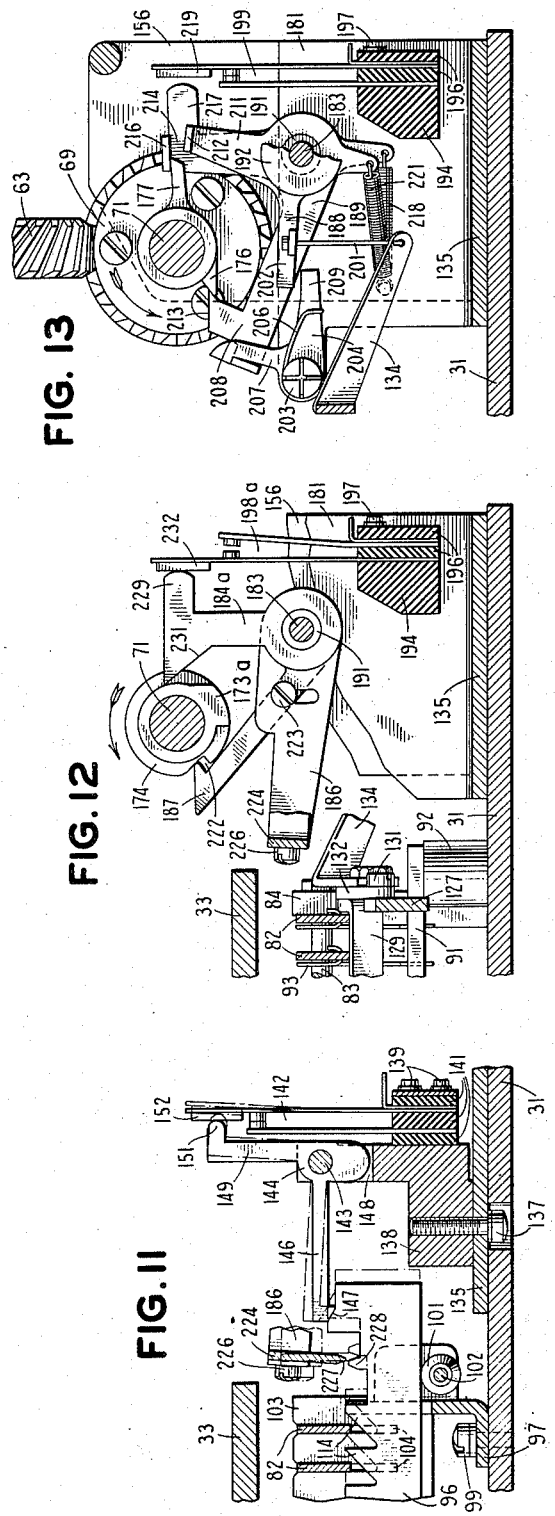
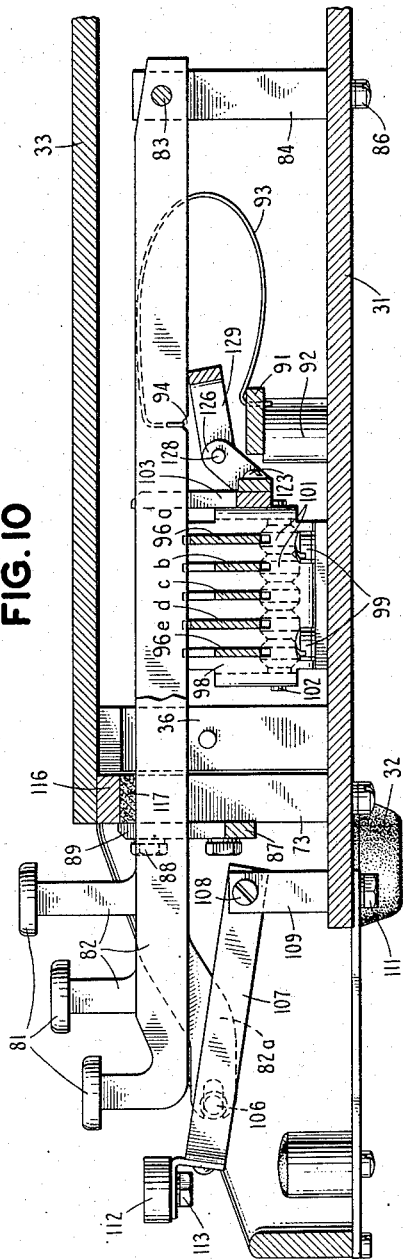
INVENTORS
P. A. NOXON
S. W. ROTHERMEL
F. J. MAUS
E. J. SORTORE
BY  Eugene C. Brown
ATTORNEY Feb. 11, 1941.  P. A. NOXON ET AL  2,231,215
TELEGRAPH PRINTER
Filed March 3, 1936  12 Sheets-Sheet 9
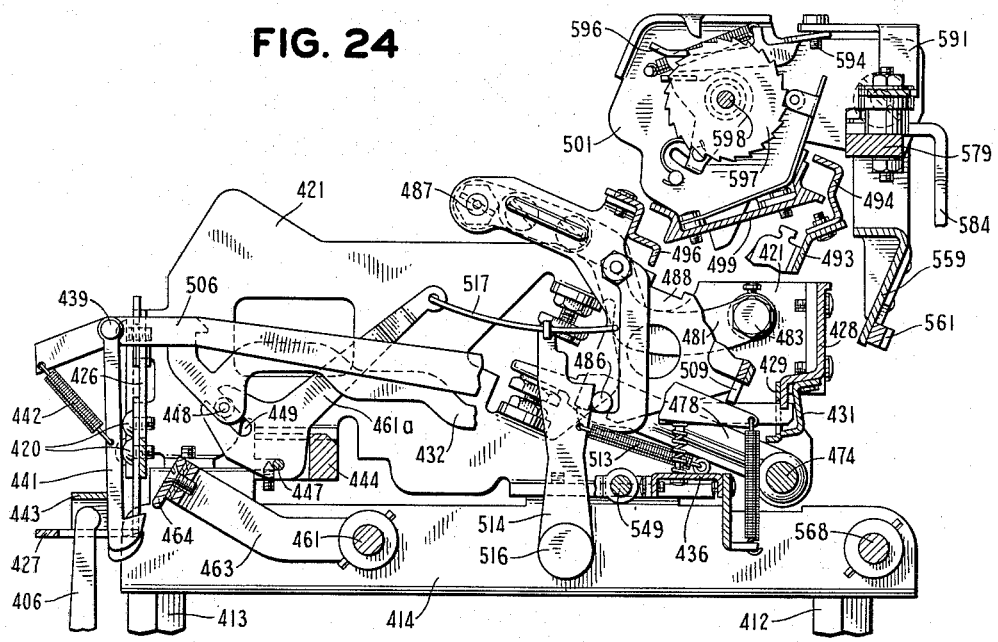
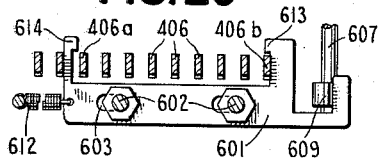
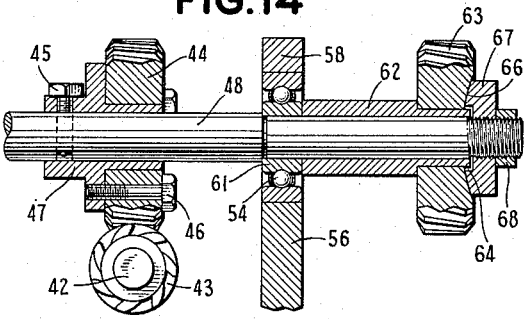
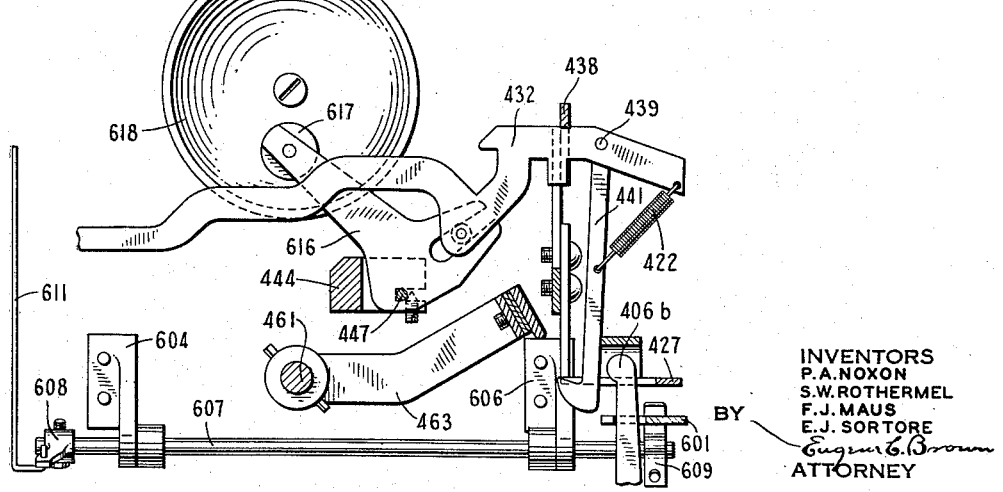
INVENTORS
P.A.NOXON
S.W.ROTHERMEL
F.J.MAUS
E.J.SORTORE
BY Eugene E. Brown
ATTORNEY

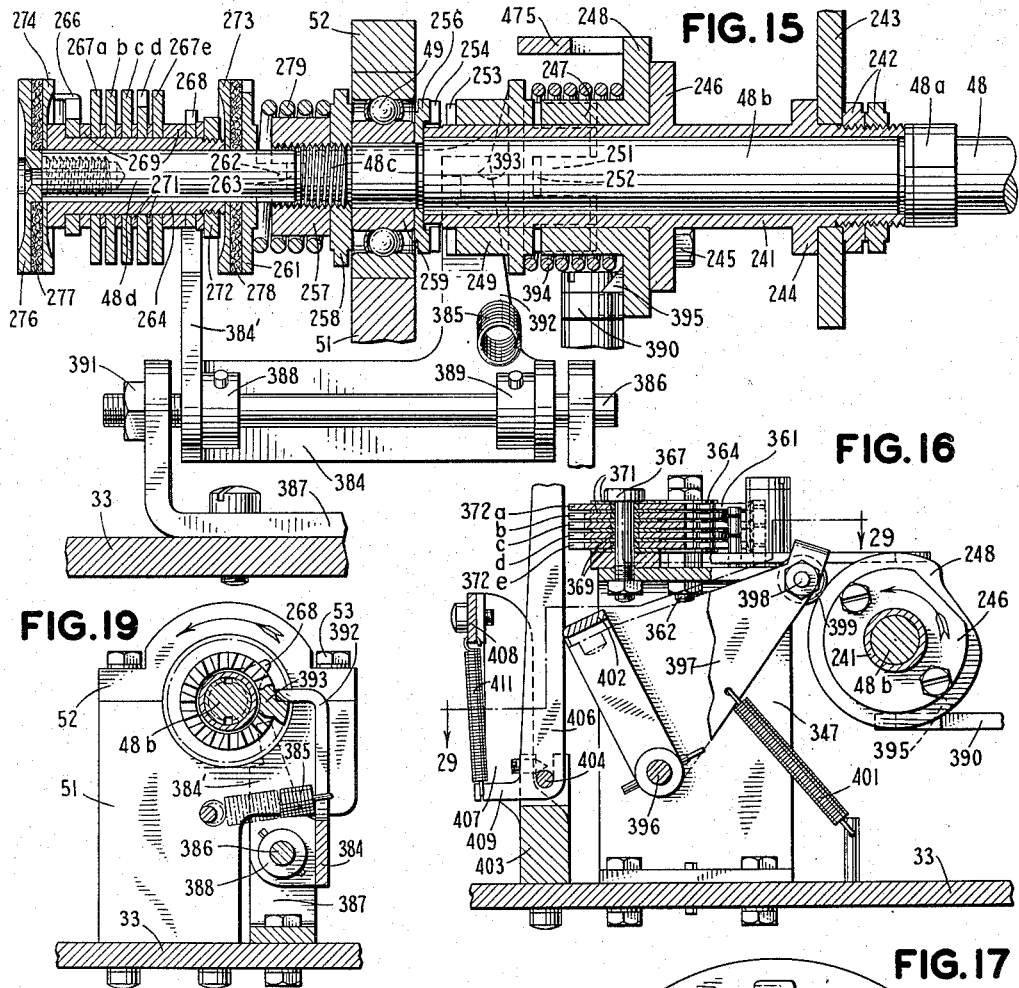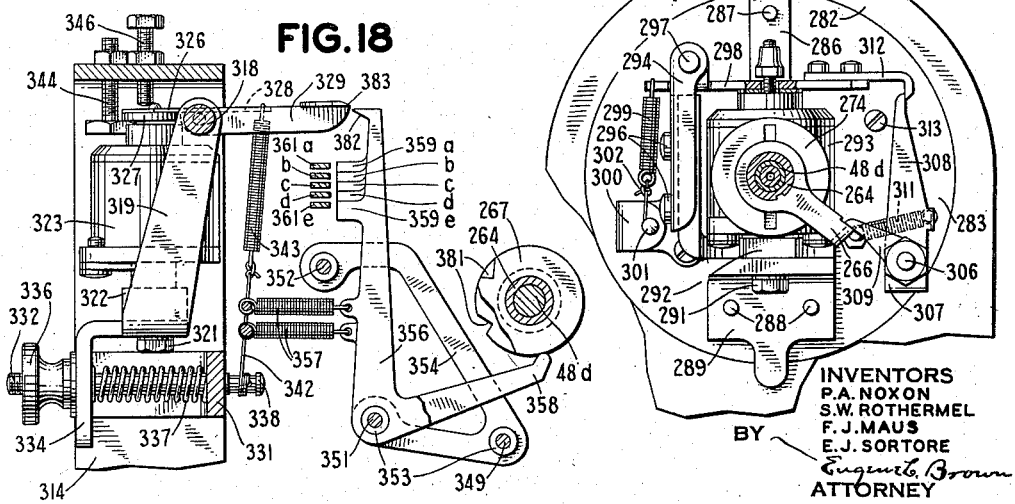

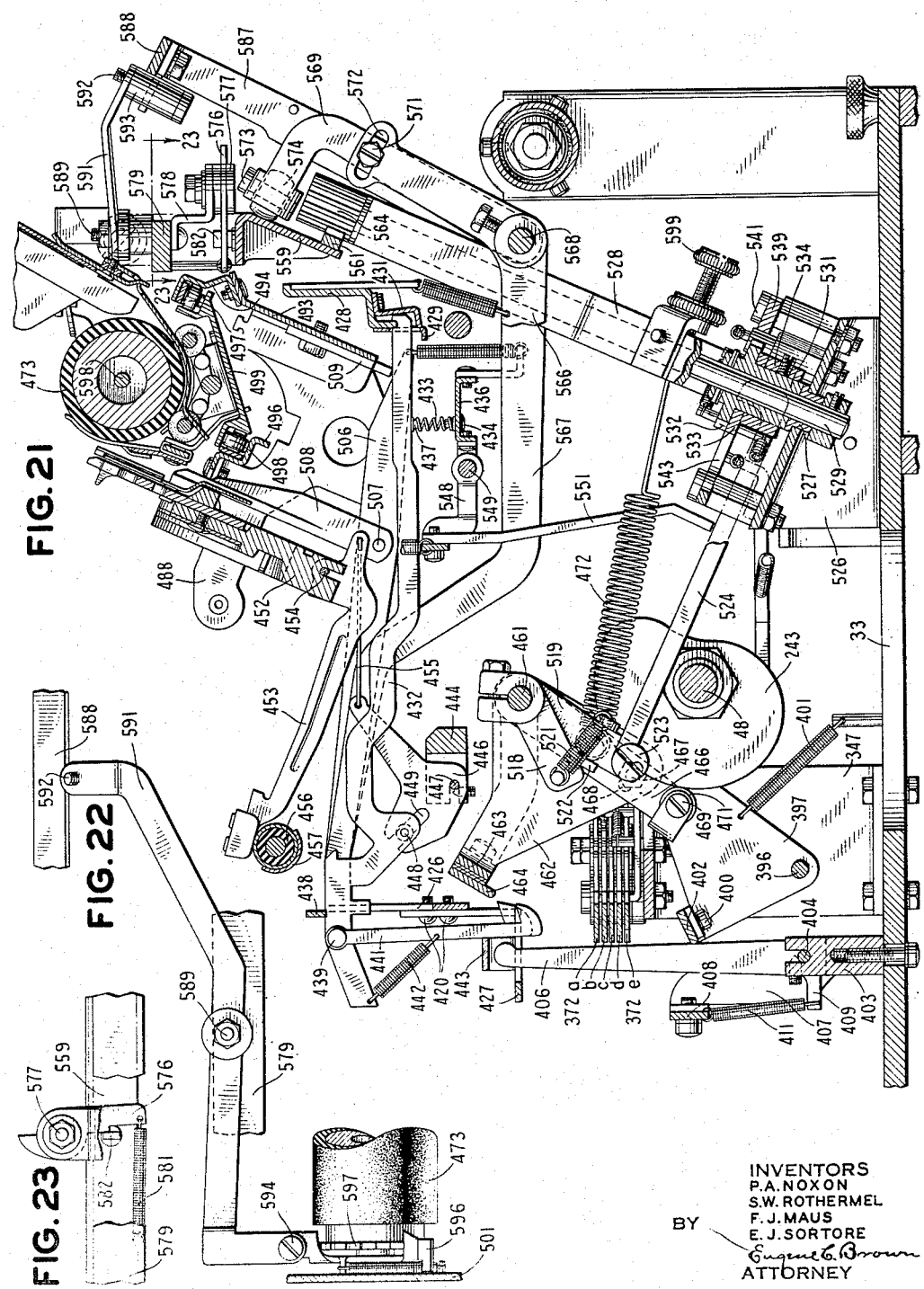

Feb. 11, 1941.    P. A. NOXON ET AL    2,231,215
TELEGRAPH PRINTER
Filed March 3, 1936    12 Sheets-Sheet 12

INVENTORS
P.A. NOXON
S.W. ROTHERMEL
F. J. MAUS
BY  E. J. SORTORE
Eugene C. Brown
ATTORNEY Patented Feb. 11, 1941

2,231,215

UNITED STATES PATENT OFFICE 2,231,215

TELEGRAPH PRINTER

Paul A. Noxon, Bergenfield, N. J., Samuel W. Rothermel, Lynbrook, N. Y., and Frank J. Maus, Paterson, and Emerson J. Sortore, Metuchen, N. J., assignors to The Western Union Telegraph Company, New York, N. Y., a corporation of New York Application March 3, 1936, Serial No. 66,906

21 Claims. (Cl. 178—25)

This invention relates primarily to signaling systems and apparatus therefor and more particularly to a telegraph machine comprising subcombinations of transmitting, selecting and printing mechanisms.

The preferred embodiment of this invention is adapted for operation in conjunction with a signaling code composed of a definite number of two different line condition impulses in various combinations thereof. Each combination is preceded by a starting impulse of uniform line condition and followed by a rest impulse of uniform line condition and opposite to that of the starting impulse.

The transmitting mechanism comprises a rotatable distributor integral with and controlled by a keyboard. The selecting mechanism includes a single electro-responsive selector magnet which cooperates with an independently rotatable cam sleeve to variably and selectively control the operation of a group of selector or code bars. The printing mechanism makes use of a standard typewriter printing unit and is operable by independently rotatable cams which are released for rotation by and in timed relation with the operation of the selector mechanism.

At the present time a large majority of the telegraph printers now in service are of the tape printer type because of the greater simplicity and lower price thereof as compared to page type printers. However, because of the inherent advantages of page printers for general telegraph service, subscribers are desirous of obtaining printers of the page type. There are at present printers of the page type available but their cost and the maintenance required to keep them in operation prevents them from being generally used.

Accordingly, the primary object of this invention is to provide a printer of the page printer type of simplified and improved construction requiring a minimum of maintenance and which may be easily and cheaply manufactured.

Another object of this invention is to provide an electro-responsive selector mechanism adapted to be used in conjunction with the printing unit of a standard typewriter.

Another object of this invention is to arrange the subcombinations of mechanisms that perform the related functions of the complete mechanism whereby said subcombinations may be easily and readily removed and interchangeably replaced when repairs or adjustments are required.

Other objects and advantages of this invention will appear hereinafter in conjunction with a detailed description thereof.

In order to more clearly illustrate the principles of the preferred embodiment of the invention, the same is shown in the drawings and described in the following paragraphs as cooperating with the keyboard and selector mechanisms and although the said mechanisms are shown and described therein, they form the subject matter of copending applications filed August 17, 1938, Serial Nos. 225,363 and 225,364, respectively, and entitled "Telegraph keyboard transmitter" and "Telegraph selector mechanism," respectively.

The preferred embodiment of this invention illustrated in the accompanying drawings contemplates the employment of a mechanism selectively responsive to the actuation of finger keys which control a set of current controlling contacts in various combinations, according to the signal character to be transmitted, represented by the actuated finger key, in conjunction with a distributor mechanism cooperating with a second set of current controlling contacts for distributing the current impulses therefrom to a telegraph circuit in the proper sequential order. The finger keys which are attached to associated key levers are arranged in substantially the same manner as those of any ordinary typewriter keyboard and are adapted on the actuation thereof to selectively position a series of permutation bars in various combinations which represent, according to a predetermined arrangement, the code combination assigned to the actuated key lever. The permutation bars are provided with beveled slots cut therein in a manner well known in the art which allow these bars to be cammed into position and prevent the operation of more than one key lever at a time. Pivoted members, individual to each permutation bar and actuated directly thereby, control a primary set of contacts. In one position of a permutation bar, its associated contact will be open and with the permutation bar; in its other position the contact will be closed. The primary set of contacts are electrically connected to a set of secondary contacts. An independently rotatable distributor mechanism, released for rotation after the positioning of the permutation bars by the actuated key lever, sequentially actuates the secondary set of contacts whereby combinations of impulses of line conditions represented by the positions of the primary set of contacts are transmitted to the sending circuit and to the selector magnet of the associated printer. Thus the positions of the permutation bars are transferred into representative combinations of electrical impulses. An auxiliary contact, called a rest contact, operable in conjunction with every combination of impulses transmitted is used to assist in maintaining synchronism between the transmitting and the receiving units.

The selector mechanism shown comprises a single selector magnet responsive to all line conditions operating in conjunction with a rotatable cam sleeve to allow or restrain the individual movement of a group of associated pivoted members. The pivoted members are equal in number to the variable selecting line conditions in one signal character and determine the respective positions of associated selector bars. The selector bars have a series of notches formed therein and are so arranged with respect to each other that for each combination of settings thereof one row of notches will be in alignment. A start magnet is connected in series with the selector magnet which serves to release for rotation the rotatable cam sleeve in proper phase relationship with the received code combinations of impulses or line conditions. The selector magnet is therefore relieved of all work except determining the movement of the associated pivoted members and consequently the selector mechanism is adapted to operate efficiently at a high rate of speed.

Disposed directly to the front of the notched selector bars are a group of so-called drop-in-bars. After the selective positioning of the selector bars is accomplished, a cam controlled bail allows the drop-in-bars to approach the selector bars whereupon one of these bars will find a series of notches in the selector bars in alignment and consequently be permitted to travel further than the other bars. The additional travel of this drop-in-bar actuates an associated hook so that it will be in the path of a print bail which is subsequently operated. The print bail which is cam operated engages said hook and by means of the movement thereof through appropriate linkages causes a typebar to be operatively actuated or various printer functions performed according to which drop-in-bar was allowed to be selectively actuated by the row of aligned notches in the selector bars. An operated typebar strikes a paper blank through an inked ribbon and thus leaves impressions therefrom on the paper.

Operating sequentially with the print bail are various other mechanisms such as those to position the drop-in-bars to normal; to reposition the selecting bars to normal, and to effect a movement of the carriage for letter spacing.

In the preferred embodiment illustrated, the paper blank is supported on a horizontal platen in operative relation with the typebars. Letter spacing is effected by the transverse movement of the carriage intermittently with the printing operations by means of a rack and pinion. The carriage is returned to its initial start position for the beginning of a new line of copy on the receipt of a carriage return signal which causes the rack and pinion to be disengaged, whereupon a returning means is rendered effective.

Feeding of the paper blank through the machine to effect line spacing is accomplished by means of another printer function signal which causes the platen to be rotated a predetermined amount for each of these signals received.

The preferred embodiment of this invention is adapted to operate in conjunction with a start-stop or simplex five-unit signaling code, although it is to be understood that with modifications it may be adapted to operate in conjunction with other codes without departing from the spirit of the invention. As is well known to those versed in the art, such codes are composed of a start impulse which is always of uniform line condition followed by a definite number, dependent upon the code, of two different line conditions in various combinations which in turn are followed by a stop impulse which is always the same and of opposite line condition from that of the start impulse. In this case the definite number of impulses are five in number and each is substantially equal to the start impulse in duration while the duration of the stop or rest impulse is variable, its length depending on the interval between consecutive signal groups. If some other code, such as a six-unit code, was employed, the definite number of impulses would be six in number and the changes required in the machine for such a code would be the addition of another set of hereinafter described elements as will be apparent as the description proceeds.

The maximum number of possible combinations of impulses available with a five-unit code is thirty-two and in order to increase the number of selections, case grouping of characters is employed. Accordingly, two case shift signals are employed, called a shift signal and an unshift signal. These signals are printer function signals and the receipt of either by the recorder causes the recorder to be positioned to properly record the associated characters in their respective groups. As in the ordinary typewriter, the two case groups are represented by two characters on a single typebar. Which one of these characters will be printed on the operation of the typebar is determined by the vertical position of the platen. The platen is raised from its normal or unshift position on the receipt of a shift signal and held in position by a latch. An unshift signal releases the latch and allows the platen to return to its normal or unshift position.

Power is furnished for all the operations, with the exception of the work performed by the selector magnet, from an electric motor, through appropriate gearing and clutch mechanism.

The various sub-combinations of mechanisms are mounted on suitable supporting means which comprise the main structural part of the machine.

A more complete and thorough understanding of the invention may be had from the following detailed description taken in conjunction with the accompanying drawings forming a part of this specification showing a preferred embodiment thereof in which:

Fig. 3 is a right end elevational view thereof;

Fig. 4 is a left end elevational view thereof;

Fig. 6 is a full size fragmentary plan view showing the left half of the machine with the printing unit removed;

Fig. 7 is a full size fragmentary plan view showing the right half of the machine with the printing unit removed;

Fig. 8 is a sectional view taken on line 8—8 of Fig. 7;

Fig. 9 is a fragmentary sectional view taken on line 9—9 of Fig. 8;

Fig. 10 is a fragmentary sectional view taken on line 10—10 of Fig. 7 showing the arrangement of the key levers and associated mechanism;

Fig. 11 is a fragmentary sectional view taken on line 11—11 of Fig. 7;

Fig. 12 is a fragmentary sectional view taken on line 12—12 of Fig. 7;

Fig. 13 is a fragmentary sectional view taken on line 13—13 of Fig. 7;

Fig. 14 is a fragmentary sectional view taken on line 14—14 of Fig. 7;

Fig. 15 is a fragmentary sectional view taken on line 15—15 of Fig. 6;

Fig. 16 is a fragmentary sectional view taken on line 16—16 of Fig. 6;

Fig. 17 is a fragmentary sectional view taken on line 17—17 of Fig. 6;

Fig. 18 is a fragmentary sectional view taken on line 18—18 of Fig. 6;

Fig. 19 is a fragmentary sectional view taken on line 19—19 of Fig. 6;

Fig. 20 is a fragmentary sectional view taken on line 20—20 of Fig. 2;

Fig. 21 is a fragmentary sectional view taken approximately on line 21—21 of Figs. 1 and 2;

Fig. 22 is a fragmentary plan view of the mechanism for rotating the printing platen;

Fig. 23 is a fragmentary sectional view taken on line 23—23 of Fig. 21;

Fig. 24 is a fragmentary sectional view taken approximately on line 24—24 of Fig. 1;

Fig. 25 is a fragmentary sectional view taken on line 25—25 of Fig. 1;

Fig. 27 (sheet 6) is a fragmentary sectional view taken on line 27—27 of Fig. 6;

Fig. 28 (sheet 6) is a circuit diagram showing connections of the printer and transmitter to the line;

Figure 1:
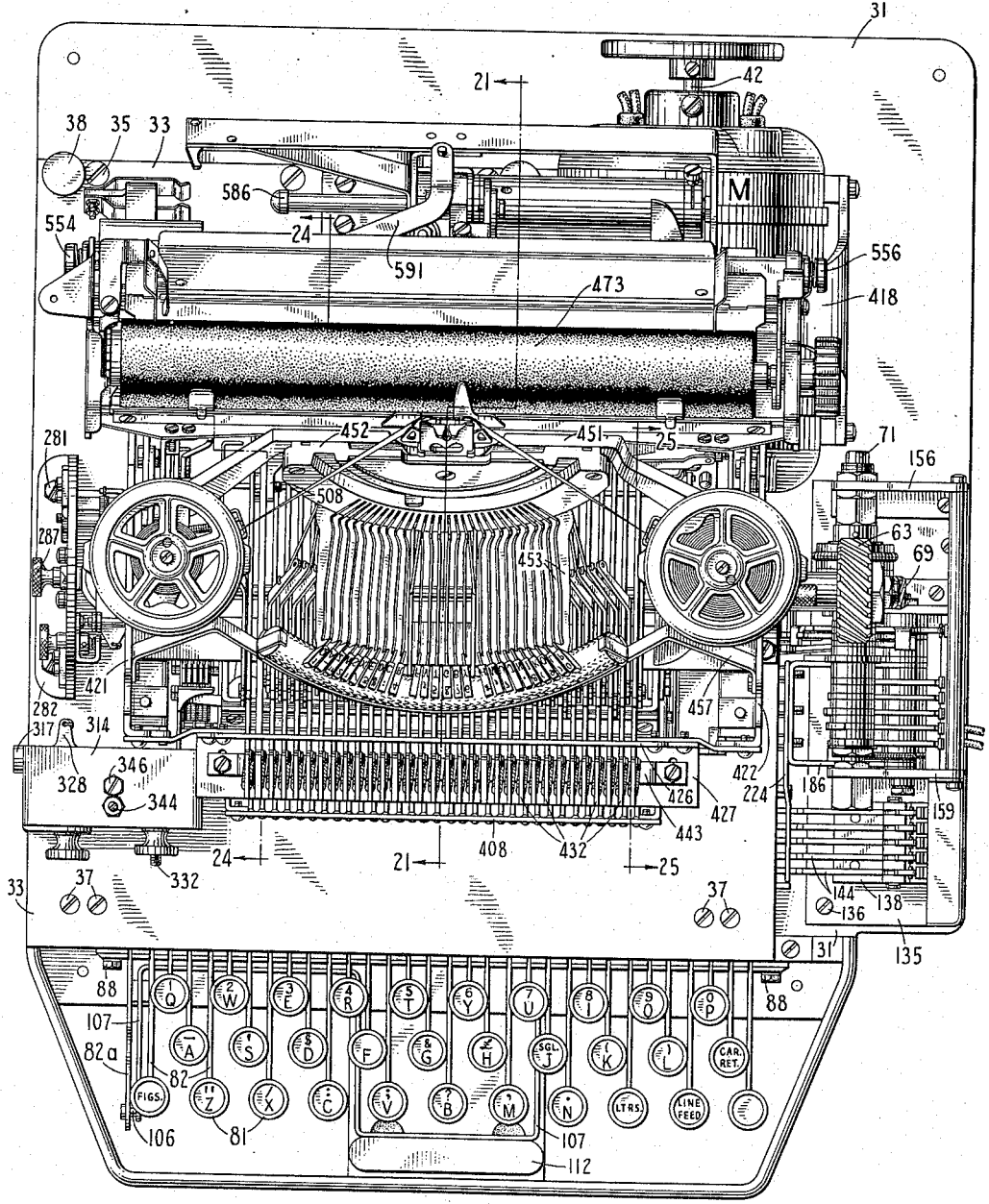
Fig. 1 is a plan view of a preferred embodiment of the invention in which the front of the machine is shown at the bottom of the drawing.

The detailed description of the structure and various parts of the invention in conjunction with the arrangement and operation thereof will now be given. Referring first to Figs. 1 to 5, the complete machine is shown supported on a main base plate 31 which has attached to the four corners of the underside thereof, four rubber feet 32. The rubber feet 32 prevent the printer from resting directly on a table or other supporting medium and furthers quieter operation of the printer. A sub-base plate 33 is located above the base plate 31. A vertical spacing plate 34, Figs. 3, 4 and 5, attached under the rear edge of the plate 33 by screws such as 35, Fig. 1, supports the rear end of the plate 33. The two front corners of the plate 33 are supported on brackets such as 36, Fig. 10, which are attached to the plate 33 by screws 37, Fig. 1. Two thumb screws 38, Figs. 4 and 5, extending through the plate 33 and vertical plate 34 are threaded into the base plate 31 to hold the plates together. Another vertical spacing plate 39, Fig. 4, attached to the underside of the plate 33 adjacent the center thereof assists in supporting the plate 33.

Driving mechanism

Figure 5:
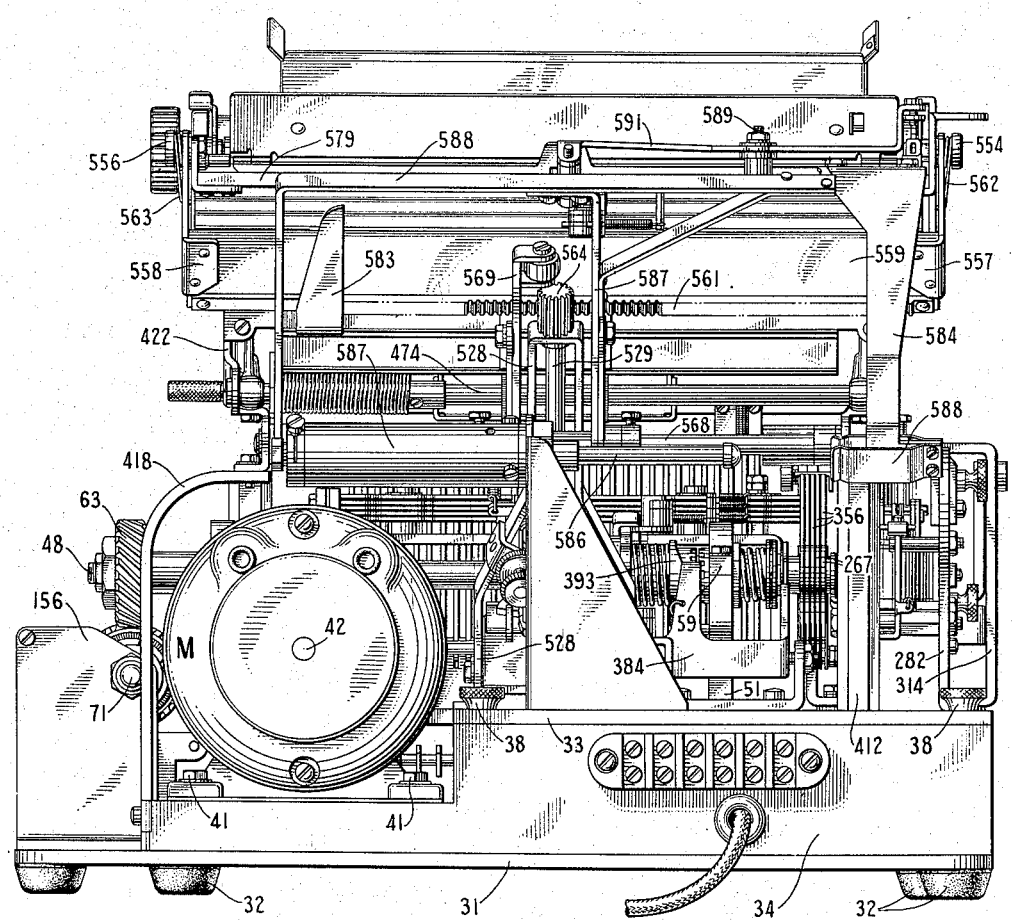
Fig. 5 is a rear elevational view thereof.

In the preferred embodiment of the invention, the power for performing the various functions of the machine is furnished by an electric motor M through appropriate gearing and clutch mechanisms and the arrangement thereof will now be described. The rear feet of the motor M are attached by screws 41 to the left hand section of the vertical plate 34, as seen in Fig. 5, which section is of reduced height. The front feet of the motor are similarly attached to the left hand section of the spacing member 39. As shown in Figs. 3 and 4, the motor shaft 42 is horizontal and extends toward the front of the machine. Attached for rotation therewith to the forward end of the motor shaft 42, is a helical gear 43, as seen in Fig. 14. In the following description, when right and left hand sections of the various parts are mentioned, they are to be considered as the right and left hand sections of the parts as shown in the figures referred to and not as sections of the printer unless specifically stated. Located directly above the gear 43 and adapted to mesh and be driven therefrom is another helical gear 44. The gear 44 is secured by screws 46, for rotation therewith, to a gear hub 47. The gear hub 47 is secured by a screw 45 to a horizontal transverse shaft 48 which comprises the main operating shaft of the machine. The operating shaft 48 extends substantially the width of the machine and is journaled adjacent the left hand end thereof in a ball bearing 49, Fig. 15, supported on a bearing post 51 which is attached to the top of the plate 33. A bearing cap 52 secured to the bearing post 51 by screws 53, Fig. 6, holds the ball bearing in place. The right hand end of the operating shaft 48 is journaled in a ball bearing 54, Fig. 14, which is supported by a bearing post 56, attached to the plate 33 by screws 57, Fig. 3. A bearing cap 58 attached to the post 56 by screws 59, holds the bearing 54 in place. Referring to Figs. 7 and 14, the right hand end of the operating shaft 48 is of smaller diameter than the main section and has thereon the inner race 61 of the roller bearing 54. Abutting the inner race 61 is a spacing collar 62, the right end of which is of reduced diameter and serves as a gear hub for a helical gear 63. The right hand face of the gear 63 has a radial keyway 64 cut therein which is adapted to receive and engage a radially extending key 66 formed on the left hand face of a nut 67. The right hand end of the operating shaft 48 is threaded and has the nut 67 in threaded engagement therewith. The nut 67 serves to clamp the inner race 61, the collar 62 and the gear 63 all together and against the larger section of the operating shaft 48. Thus the gear 63 will rotate with the shaft 48. A lock nut 68 threaded to the shaft 48 locks the nut 67 in position. As seen in Figs. 3, 7 and 8, a helical gear 69 is directly beneath and in mesh with the gear 63. The gear 69 is located on a shaft, generally indicated as 71, extending toward the front of the machine, which will be termed the transmitting shaft. The gear 69 is adapted to rotate the shaft 71 through a clutch arrangement which will be hereinafter described.

In the following description it will be assumed that the motor M is constantly rotating; consequently, the shaft 48 and the gear 69 will also constantly rotate due to the power communicated thereto through their associated gears.

Although the machine comprises both a printing unit and a transmitting unit, such machines are often referred to as printers. In the following description both units are considered as comprising the combined machine but as the description thereof proceeds, it will be apparent that either unit may be operated independently of the other. When the hereinafter described start and selector magnets are in series with the transmitting mechanism as shown in the wiring diagram, Fig. 28, the machine operates as a combined unit, the printing unit recording the characters transmitted by the transmitting mechanism. However, by providing separate circuits for the printing and transmitting units, each may be operated independent of the other.

Keyboard

A description of the keyboard and transmitting mechanism will now be given which comprises means for making a series of mechanical selections and immediately thereafter automatically transferring these mechanical selections into representative code combinations of electrical impulses. As is evident from Fig. 1, the arrangement of the character keys is substantially the same as that of any well known three bank typewriter keyboard. The key levers 82, on which are mounted key designating caps 81, are pivotally supported at their rear end on a rod 83 (Fig. 10). The rod 83 extends transversely of the machine and is supported in a series of posts 84, which are attached adjacent the center of the base plate 31 by screws 86. A comb plate 87 extending between two blocks 72 and 73 and attached thereto by screws 88 has therein a series of vertical slots 89. The slots 89 guide the keylevers 82 in their vertical movement. A spring mounting bar 91, Figs. 4 and 10, supported on spacers 92, is attached to the base plate 31. Each keylever 82 is provided with a single wire spring 93 which tends to elevate the front end thereof. One end of each spring is engaged in a notch 94 in its associated keylever 82, the other end being located in an individual hole in the spring mounting bar 91.

Situated directly beneath and extending horizontally in a direction at right angles to the keylevers 82 are a series of five permutation bars indicated in general at 96 in Fig. 11 and individually by reference characters 96a to 96e in Figs. 4 and 10. The permutation bars 96 are adapted to slide transversely and are guided in their movement by individual slots in guide brackets 97 (Fig. 11) and 98 (Fig. 10) which are located adjacent the right and left hand ends respectively of the permutation bars. The guide brackets 97 and 98 are attached to the base plate 31 by screws 99. The permutation bars 96 rest on individual rollers 101 which are pivotally supported on rods 102 in the guide brackets, thereby permitting said bars to slide with a minimum amount of friction. Another comb plate 103 attached to the guide brackets 97 and 98 has a series of slots therein which guide the rear of the keylevers in their vertical movement. The arrangement of the letter space keylever 82a is slightly different from the arrangement of the other keylevers. The end thereof is bifurcated and engages a pin 106 in the left hand end, Figs. 1 and 10, of a space key operating member 107. The space key operating member 107 is square S-shaped and is pivotally supported on screws 108 in slots in a series of three blocks 109, one only of which is shown, and which in turn are attached at the front of the base plate 31 by screws 111. An elongated space key 112 attached to the space key operating member 107 by screws 113 is supported thereby at the front and center of the keyboard.

Each of the permutation bars 96 has thereon a different arrangement of upwardly extending bevelled projections 114, Fig. 11, which are so arranged that the bars will slide transversely from side to side in various combinations as various keylevers 82 are depressed. When any one of the keylevers 82 is depressed, the lower edge thereof engages the bevelled projections 114 of the permutation bars and transversely actuates said permutation bars 96 to assume a position combination which is representative of the depressed keylever. As is well understood in the art, each position combination of the permutation bars represents an associated keylever and the bevelled projections 114 prevent the operation of more than one keylever at a time. The permutation bars 96 are not biased in any position but move from their left to their right position or vice versa in various combinations as a keylever 82 is depressed, where they remain until another keylever is subsequently depressed.

Figure 2:
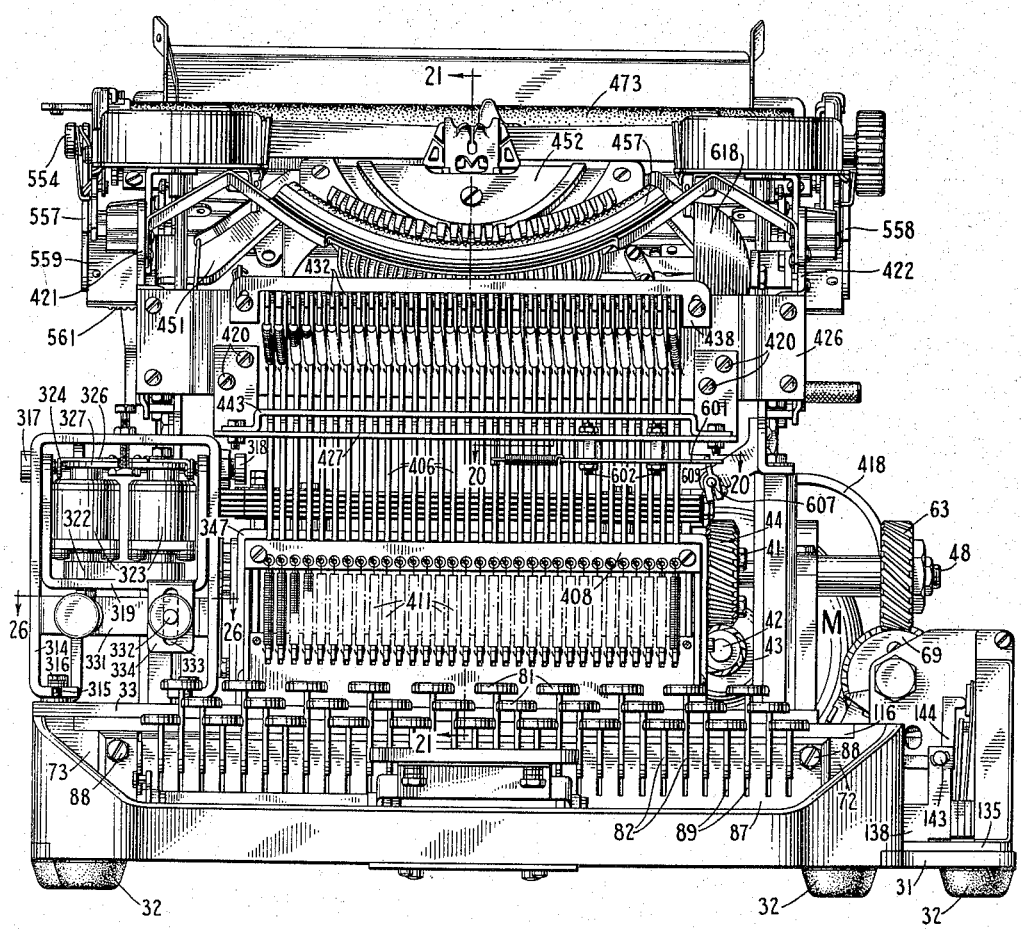
Fig. 2 is a front elevational view thereof.
Figure 26:
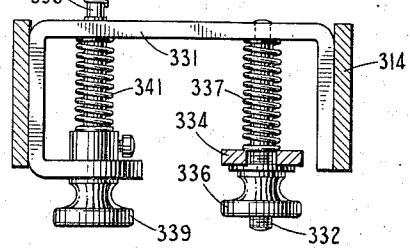
Fig. 26 (sheet 2) is a fragmentary sectional view taken on line 26—26 of Fig. 2.

Attached to recessed portions of blocks 72 and 73, carried by base plate 31, Figs. 2, 7 and 10, and extending therebetween, is a bar 116 which serves to stop the upward movement of the keylevers 82. A strip of resilient material 117, such as leather, is attached to the underside of the bar 116 and permits the keylevers 82 to return to the normal position with less noise.

Referring to Figs. 4, 7, 10 and 12, attached by screws 123 and 124 to the left and right hand ends of the comb plate 103 and extending toward the rear of the machine are two right angle brackets 126 and 127, respectively. Pivotally supported on a shoulder screw 128 in the bracket 126 is one end of a universal bail 129. Pivotally supported on a shoulder screw 131 in the bracket 127 is a lever 132. Attached by screws 133 to the lever 132 is a trip lever 134 and the right hand end of the universal bail 129. The universal bail 129 extends beneath the keylevers 82 and is held in contact, by means hereinafter described, with each and every keylever 82. Thus it is evident that the universal bail 129 and the trip lever 134 will pivot in a clockwise direction, as seen in Fig. 10, whenever a keylever 82 is depressed and by means to be hereinafter described, said members will return to their normal positions when the depressed keylever is released.

Transmitting mechanism

The hereinbefore mentioned transmitting mechanism will now be described in detail and referring to Figs. 1, 2 and 3, a transmitting unit mounting plate 135 is attached by screws 136 to the right hand front corner of the printer base 31. Secured by screws 137 to the plate 135 is an angle block 138. Secured to the angle block 138 by screws 139, between strips of insulating material 141, Fig. 11, is a series of five spring contacts indicated in general at 142, Fig. 11, and individually by reference numerals 142a to 142e in Fig. 3. On a rod 143, Fig. 11, secured in the upper part of the angle block 138, are pivotally mounted a series of five bell cranks indicated in general at 144, Fig. 11, and individually at 144a to 144e in Fig. 7. Each of the bell-cranks 144, Fig. 11, has a substantially horizontal arm 146, the end of which is bevelled and rests on another bevelled surface 147 on the end of a permutation bar 96. Each bell-crank 144 has an associated permutation bar and is kept aligned therewith by slots 148 in the angle block 138. On each of the substantially vertical arms 149 of the bell-cranks 144 is a rightwardly extending projection 151 which presses against pieces of insulating material 152 on the tongue of each contact 142. Each contact 142 has an associated bell-crank 144.

Assume that a permutation bar 96 is in its left hand position as shown by the full lines in Fig. 11, and that a key lever 82 is depressed, which causes the permutation bar 96 to be slid to its right hand position. The right hand position of the selector bar 96 is represented by the dot-dashed outline thereof. As the permutation bar 96 moves to its right hand position, the bevelled edge 147 thereof cooperating with the bevel on the end of its associated bell-crank 144, causes the bell-crank to rock in a clock-wise direction. As the bell-crank 144 is rocked to the position represented by the dot-dashed outline, the projection 151 on the vertical arm thereof engages the insulating material 152 on the tongue of its associated contact 142 and causes said contact to open. As hereinbefore stated, the actuation of certain keylevers will cause the permutation bar 96 to move from its right hand position to its left hand position and in so doing, the tongue of the associated contact 142 is allowed to rock the bell-crank 144 in a counter-clockwise direction and consequently close the contact 142. As will be hereinafter described, the permutation bars 96 are locked in the positions to which they are actuated by an actuated keylever 82 during the transmission of the group of impulses represented by the actuated keylever. Thus it is evident from the above description that as the permutation bars 96 are actuated to assume various combinations of settings by an actuated keylever 82, the contacts 142 are actuated to assume various combinations of settings which correspond to the settings of the permutation bars.

In telegraph practice it is the custom to refer to the two different line conditions that comprise telegraph signals as spacing and marking intervals or impulses. Accordingly, in accordance with a predetermined arrangement, the various members of a transmitting mechanism that determine whether spacing or marking impulses are transmitted, are considered to have associated spacing and marking positions. In cooperation with the signaling code employed in this machine, the transmitting mechanism is so arranged that the left hand position of a permutation bar 96 corresponds to a marking impulse and the right hand position to a spacing impulse. In following paragraphs members having these two positions will be referred to as being either in their spacing or marking position.

It is thought that a clearer understanding of the machine will be had by following through the operation thereof on the actuation of a certain keylever and it will be assumed that the M keylever is actuated. In the preferred embodiment, the bevelled projections 114 on the permutation bars 96 are so arranged that when the M keylever 82 is actuated, the permutation bars 96a and 96b are spacingly positioned and the permutation bars 96c to 96e markingly positioned. Consequently, as hereinbefore described, for this combination of settings of the permutation bars 96, the contacts 142a and 142b will be opened and the contacts 142c to 142e will be closed. The operation of the apparatus in transmitting representative spacing and marking impulses will be hereinafter described.

The hereinbefore mentioned transmitting shaft 71 is journaled at the left and right hand ends thereof, best shown in Fig. 8, in bushings 153 and 154. The left hand bushing 153 is supported in a bearing bracket 156. Two nuts 157 on either side of the bracket 156 and in threaded engagement with a threaded portion of the bushing 153 holds the bushing in place. The right hand bushing 154 is supported in a bearing bracket 159 and secured thereto by a cap nut 161 in threaded engagement with the bushing 154. The bearing brackets 156 and 159 are secured by screws 158 to the top of the plate 135 which in turn is secured to the top of the base plate 31. The transmitting shaft 71 has sections 71a to 71d of different diameters and a flange or collar 71e integral therewith. A gear hub 163 loosely mounted on the section 71b of the transmitting shaft, abutting the left hand face of the flange 71e, has secured thereto by pilot screws 164 the hereinbefore mentioned gear 69. The left hand sections 166 of the pilot screws 164 are engaged in slots 167, Fig. 9, in three Bakelite segments 168. The segments 168, Figs. 8 and 9, comprise a segmented ring and are located on the outer circumference of a collar 169. The collar 169 is attached by a pin 171 to the shaft 71 for rotation therewith in abutting relation with the left hand face of the gear hub 163. A circular coiled radially contractible spring 172 surrounds the segments 168 and holds the inner surface thereof frictionally engaged with the outer surface of the collar 169. As hereinbefore stated, it is assumed that the motor M is constantly rotating and consequently by means of the described gear train comprising the motor pinion 43, the gear 44, the shaft 48 and the gear 63, the gear 69, Figs. 7 and 8, will constantly rotate. As the screws 164 rotate with the gear 69 and the ends 166 are engaged by the segments 168, the segments will therefore also rotate with the gear 69. The segments 168 being frictionally engaged with the collar 169, the collar 169 and shaft 71 will therefore tend to rotate with the segments 168. Normally, the shaft 71 is restrained from rotation as will be hereinafter described, and consequently, at such times, the segments 168 will slide on the circumference of the collar 169.

Located on the section 71c of the transmitting shaft are a series of disc cams 173a to 173e, 174, 176 and a stop-arm 177. These cams and the stop-arm are clamped in a predetermined arrangement against the flange 71e for rotation with the shaft 71, intermediate with spacers 178 by a nut 179 threaded on the shaft 71. The function and operation of the cams 173a to 173e, 174 and 176, will be described in following paragraphs.

An angle bracket 181 is secured to the transmitting base plate 135 by screws 182. On a rod 183, Figs. 7, 8, 12 and 13, supported in the brackets 159 and 181, are pivotally mounted a series of contact levers 184a to 184e, a U-shaped lever 186, a lever 187 and two bell-cranks 188 and 189. The contact levers 184a to 184e, all being similar, will be referred to collectively as levers 184 and each is in operative relation with an associated cam 173a to 173e on the shaft 71. The lever 187 is in operative relation with the cam 174 and the bell-crank 189 is in operative relation with the cam 176, the stop-arm 177 and the contact 199, as will be hereinafter described. The bell-crank 188 is in operative relation with the stop-arm 177. The levers and bell-cranks are all pivoted on bushings 191 on the rod 183 and kept in alignment with their associated cams by spacers 192. Secured by screws 193 between the brackets 159 and 181 is a block of insulating material 194. Attached to the block 194 by screws 197 between other pieces of insulating material 196 are a group of six spring contacts 198a to 198e and 199, Figs. 7 and 8. As seen in Figs. 12 and 13, the contact 199 is adapted to open when operated as will be hereinafter described, and the contacts 198a to 198e are adapted to close when operated. Each of the contacts 198a to 198e are in operative relation with an associated contact lever 184a to 184e and the contact 199 is in operative relation with the bell-crank 189. The levers 184 sequentially close the contacts 198a to 198e, as will be hereinafter described.

The above described members comprise the transmitting mechanism of the machine and the operation thereof in conjunction with the operation of a keylever 82 of the keyboard will now be described. As stated, the depressing of a keylever 82, Figs. 11, 12 and 13, selectively positions the permutation bars 96 and concomitantly rocks the universal bail 129. The universal bail 129 in rocking also causes the trip lever 134 to be actuated to its operated position. Attached to the right end of the trip lever 134 is a link 201, the other end of which is attached to the leftwardly extending arm 202 of the bell-crank 188. Consequently, the operation of the trip lever 134 rocks the bell-crank 188 to its operated position. On a shoulder screw 203 secured in the upper left hand section of the bracket 181 is pivotally mounted a bell-crank 204. A spring 206 coiled about the screw 203 has one end secured therein, the other end being hooked around an arm of the bell-crank 24, tends to rock the bell-crank in a counter-clockwise direction. An upwardly extending arm 207 of the bell-crank 204 is hook-shaped and normally engages the end of a leftwardly extending arm 208 of the bell-crank 189. A rightwardly extending arm 209 of the bell-crank 204 is adapted to be engaged by the arm 202 of the bell-crank 188 when the bell-crank 188 rocks. The substantially vertical arm 211 of the bell-crank 188 has the end 212 bent to form a right angle with the arm 211. The arm 208 of the bell-crank 189 has a bevelled projection 213 which is adapted to be operatively engaged with the cam 176. The substantially vertical arm 214 of the bell-crank 189 has the end 216 thereof bent to form a right angle with the arm 214. The end 216 is normally engaged with a stop arm 177 and thus the shaft 71 is prevented from rotating. A projection 217 on the arm 214 is in operative relation with the normally closed contact 199.

For the following described cycle of operation of the transmitting mechanism it will be assumed that the actuated keylever 82 was released immediately after being depressed. As stated, the operation of a keylever 82 actuates the trip lever 134 which in turn causes the bell-crank 188 to rock about the rod 183. As the bell-crank 188 rocks the arm 202 thereof engages the arm 209 of bell-crank 204. The bell-crank 204 thereupon rocks in a clockwise direction and disengages the hooked arm 207 from the end of the arm 208 of the bell-crank 189. The bell-crank 189 then rocks in a clockwise direction by action of a spring 218 attached at the lower end thereof. As the bell-crank 189 rocks the projection 217 thereon engages a piece of insulating material 219 on the tongue of the contact 199 and opens said contact. Also, as the bell-crank 189 rocks, the end 216 of the arm 214, which is normally engaged with stop-arm 177, slides out of engagement with said stop-arm. Thereupon the stop-arm 177 and the shaft 71 is free to rotate by action of the hereinbefore described friction clutch. As it was assumed that the actuated keylever 82 was released immediately after being depressed, a spring 221 attached to the bell-crank 188, returns the bell-crank 188, the trip lever 134 and the universal bail 219 to their normal positions. This allows the spring 206 to return the bell-crank 204 to a position where the latch arm 207 is adapted to again latch the arm 208 of the bell-crank 189 at a predetermined time as will be hereinafter described.

To return now to the operation of the various members as the shaft 71 revolves, it being released for rotation as heretofore described. After the shaft 71 has rotated a few degrees, the end of the lever 187, Fig. 12, passes out of the notch 222 in its associated disc cam 174 and consequently rocks the lever 187 in a counter-clockwise direction. The U-shaped lever 186 which is pivoted at the ends on the rod 183, is secured to the lever 187 to rock therewith by a screw 223. Attached by screws 226 to the cross section of the lever 186 is a locking member 224 which has a section 227 extending over the permutation bars 96, best seen in Fig. 7. The section 227 of the locking member 224 in operative relation with the selecting levers 96, Fig. 11, is wedge-shaped and adapted to engage with a wedge-shaped projection 228 (Fig. 11) on each of the permutation bars 96. Normally the section 227 of the member 224 is not engaged with the projections 228, but shortly after the shaft 71 starts to rotate, the section 227 is lowered, as described, and thereupon engages the left or right sides of the projections 228. The side of the projection 228 that is engaged with the section 227 of the locking member 224 is determined by the selective positions of each individual permutation bar 96. Thus the permutation bars 96 are locked in their selected positions and remain so until released, as will be hereinafter described. The bevelled projections 114 on the permutation bars 96 prevent the operation of another keylever 82 until the permutation bars are unlocked.

The operation of the contact levers 184, Fig. 12, will now be described. These levers are substantially T-shaped, being pivoted at the lower end on the rod 183 and having right and left hand projections 229 and 231 at the upper end. The spring tongue of each contact 198 is tensioned, and presses pieces of insulating material 232 attached at the upper end of each tongue, against the projection 229 of their associated contact lever 184 and thus holds the bevelled projection 231 against the face of its associated cam 173 on the shaft 71. Each of the cams 173 has a high part which is equal to approximately one-seventh of the circumference of the cam. In the rest or normal position of shaft 71, none of the high parts of the cams 173 are engaged with their associated contact levers. After the shaft has rotated about one-seventh of a revolution from its rest position, the high part of cam 173a engages its associated contact lever 184a and rocks the lever in a clockwise direction as seen in Fig. 12. The contact lever 184a in rocking actuates the tongue of contact 198a so that it makes contact with its back stop. As the high part of cam 173a is engaged with the contact lever 184a for about one-seventh of the revolution of the shaft 71, the contact 198a will remain closed for substantially an equal length of time. As the high part of cam 173a passes out of engagement with the contact lever 184a, the spring tongue of the contact 198a rocks the lever in a counter-clockwise direction and thus the contact 198a is opened. As the contact 198a is opening, the high part of the cam 173b engages its associated contact lever 184b to close the associated contact 198b in the same manner as contact 198a was closed. It also remains closed for about one-seventh of a revolution of the shaft 71. Likewise, contacts 198c to 198e are each closed for approximately one-seventh of the revolution of the shaft 71. The contacts 198a to 198e are so arranged in conjunction with their associated cams 173a to 173e that a subsequent contact such as 173c closes just before a preceding contact such as 173b opens. Thus, from about one-seventh of a revolution to about six-sevenths of a revolution of the shaft 71, one of the contacts 198a to 198e will be closed. Just before the contact 198e opens, the cam 176 engages the bevelled surface 213 on the bell-crank 189 and rocks the bell-crank in a counter-clockwise direction against the biasing action of the spring 218. There are three functions which are performed as the bell-crank 189 rocks in a counter-clockwise direction. They are: First, the contact 199 is allowed to close by action of its spring tongue just before the contact 198e is allowed to open; second, the arm 208 is lowered so that the latch arm 207 is engageable with the end of the arm 208, and as the cam 178 passes out of engagement with the bevelled surface 213, the bell-crank 189 is thereby held in its normal unoperated position; and third, the projection 216 is moved into the path of the stop-arm 177 and when the stop-arm comes in contact therewith, it will be stopped thereat in its predetermined stop or rest position. The stop-arm 177 is adapted to engage the projection 216 just after the cam 176 passes out of engagement with the bevelled surface 213. Just before the shaft 71 is brought to rest, the end of the lever 187, Fig. 12, is pulled by a spring 233 into the notch 222 in its associated cam 174 and consequently the locking member 224 is raised, which disengages the section 227, Fig. 11, and the projections 228 of the notched bars 96.

In brief review, the operation of the keyboard and transmitting mechanism is as follows: The actuation of a keylever 82, Figs. 10 to 13, selectively positions the permutation bars 96 in a combination of settings which represent, in accordance with a predetermined arrangement, the actuated keylever. The selective positions of the permutation bars 96 are transferred to the contacts 142 by the bell-cranks 144. The actuated keylever 82 concomitantly operates the universal bail 129 to cause the release of the stop-arm 177 whereupon the shaft 71 is free to rotate with the gear 69. The release of the stop-arm 177 is adapted to take place near the end of the stroke of the universal bail 129 which insures that the permutation bars 96 are in their selected positions. During substantially the whole of the revolution of the shaft 71, the permutation bars 96 are locked in position by the locking member 224 and thus prevents the actuation of a second keylever 82 until the shaft 71 has completed the revolution associated with the first actuated keylever. Actually, the permutation bars 96 are unlocked just before the shaft 71 completes a revolution but as an appreciable length of time is required to actuate a keylever 82, the shaft 71 will invariably be stopped in its predetermined rest position before a keylever can be actuated to release it for another revolution. However, if a keylever 82 could be actuated instantaneously with the unlocking of the permutation bars 96 to cause the latch arm 207 to be out of operative relation with the arm 208 of the bell-crank 189, a pause in the rotation of the transmitting shaft 71 would be introduced by means of the overthrow of the bell-crank 189 when operated by the cam 176. The cam 176 actuates the bell-crank 189 in a counterclockwise direction very near the end of a revolution of the shaft 71, and if the latch arm 207 did not latch the bell-crank 189 in its normal position, the end 216 of the arm 214 and the stop arm 177 would momentarily engage before the spring 218 could rotate the bell-crank 189 to its normal position and thus cause a definite pause in the rotation of the transmitting shaft 71. Thus the shaft 71 makes one revolution for each actuated keylever and is stopped at the end of each revolution. In the rest position of the shaft 71 the contact 199 is closed and at the same time that the shaft is released for a revolution, the contact 199 is opened. There is then an interval equal to about one-seventh of the revolution when all the contacts 198a to 198e and 199 are opened. The contacts 198a to 198e are then sequentially closed, each for about one-seventh of the revolution, after which the contact 199 is again closed for the remainder of the revolution.

In connection with the above description the electrical circuits will now be described. Referring to Fig. 28, line battery at 234 is connected over conductor 236 in parallel to the tongue of contact 199 and to the back stops of contacts 142a to 142e. The tongues of contacts 142a to 142e are connected by conductors 237a to 237e to respective tongues of contacts 198a to 198e. The back stops of contacts 198a to 198e and 199 are connected in parallel by conductor 238 to the line. In series with the line is a selector magnet and a start magnet, the purpose and operation of which will be hereinafter described.

In the preferred form of this invention, marking impulses represent a line condition during which current is transmitted and spacing impulses represent a line condition during which no current is transmitted. As stated, in the rest position of the shaft 71, the contact 199 is closed and thus, as shown in Fig. 28, a circuit is completed from battery at 234 over conductor 236 through the contact 199 and thence over conductor 238 to the line. Thus a marking impulse, which is the rest impulse, is transmitted. Again, assume that the M keylever 82 is actuated, which closes the contacts 142c to 142e and causes the release of the shaft 71. As described, the contact 199 is thereupon opened and consequently opens the line circuit before any of the contacts 198a to 198e are closed. Thus an interval of no current or a spacing interval is transmitted which is the start impulse. The contacts 198a to 198e are then sequentially closed and transmit to the line combinations of marking and spacing intervals. The contacts 142a to 142e being opened or closed determine whether spacing or marking impulses respectively will be transmitted as their associated contacts 198a to 198e are sequentially closed. As contacts 142a and 142b are assumed to be open and contacts 142c to 142e to be closed, five impulses, the first two of which are spacing and the last three of which are marking, will be transmitted. As contact 198e opens, contact 199 is closed and consequently a marking or rest impulse is invariably transmitted at the end of each combination of impulses. Thus a combination of impulses representative of an actuated keylever which is invariably preceded by a spacing start impulse and invariably followed by a marking rest impulse is transmitted.

In the above cycle of operation of the transmitting mechanism it was assumed that the actuated keylever 82 was released immediately after being depressed. The operation will now be described when an actuated keylever 82 is held depressed for a longer length of time than is necessary for transmission of its associated combination of impulses. Referring to Fig. 13, the bell-cranks 188 and 204 will be rotated to their operated positions and remain there as long as a keylever 82 is held depressed. This places the projection 212 of the bell-crank 188 in the path of the stop-arm 177. Therefore, when the stop-arm 177 has nearly completed a revolution, it will engage the projection 212 and be brought to a stop thereat a few degrees ahead of its normal stop position. However, in this position of the shaft 71 the cam 176 will have rocked the bell-crank 189 to allow the contact 199 to close and consequently transmit the rest impulse and also to bring the projection 216 into the path of the stop-arm 177. As the actuated keylever 82 is finally released, the bell-cranks 204 and 188 rock to their normal positions. In so doing, the projection 212 of the bell-crank 188 disengages the stop-arm 177, whereupon the shaft 71 will rotate to its normal stop position. The bell-crank 204 in assuming its normal position, allows the hooked end 207 to engage the arm 208 of the bell-crank 189 and thus lock the bell-crank 189 in its normal position. Thus the transmitting mechanism is returned to normal, ready to be released in conjunction with the actuation of the same or another keylever.

*Operating shaft*

The printing unit along with the various associated mechanisms will now be described. Referring to Figs. 6 and 15, the operating shaft 48 is journaled and adapted to be continuously rotated as hereinbefore described. As seen in Fig. 15, a sleeve member 241 is loosely mounted on a section 48b of the main operating shaft 48 abutting a collar 48a integral with the shaft 48. The right hand end of the sleeve 241 is threaded and has threaded thereon nuts 242 which clamp a print cam 243 against a flange 244 of the sleeve 241 for rotation therewith. Secured by screws 245 to the left hand side of a flange 246 integral with and extending radially from adjacent the center of the sleeve 241 is a collar 247. Formed on the right hand end of the collar 247 is a disc cam 248 which will be referred to as a drop-in cam. Loosely mounted on the sleeve 241 adjacent the left hand end thereof is a collar 249. The collar 249 is operatively engaged and therefore adapted to rotate with the collar 247 by means of interengaging tongues 251 and grooves 252, shown dotted, formed on and in the collars 247 and 249, respectively. Thus the collar 249 is adapted to rotate with the sleeve 241 but is slidable along the sleeve by means hereinafter described to bring teeth 253 disposed on the left hand face thereof into or out of engagement with similar teeth 254 disposed on the right hand face of a disc member 256.

A collar 257 in threaded engagement with a threaded portion 48c of the operating shaft 48 clamps a disc member 258, the inner race 259 of the roller bearing 49 and the disc member 256 against the section 48b of the main shaft 48 which is of larger diameter for rotation therewith. The disc member 256 is also keyed to the shaft 48 to insure its rotation therewith. Loosely mounted on the section 48d of the shaft 48 is a plate member 261 which is operatively engaged with the collar 257 for rotation therewith and consequently with the shaft 48, by interengaging tongues and grooves 262 and 263, shown dotted, formed on and in the plate member 261 and the collar 257, respectively. Loosely mounted on the section 48d of the main shaft 48 is a selector cam sleeve 264. Fixed to the cam sleeve 264 for rotation therewith is a stop-arm 266, a series of five notched selector cam discs 267a to 267e and a start cam 268 intermediate with spacers 269 and lock washers 271. A nut 272 threaded on the cam sleeve 264 clamps the above mentioned members together and holds them in place. Loosely mounted on the section 48d of the shaft 48 at each end of the cam sleeve 264 are two friction discs 273 and 274, which are keyed to the sleeve 264 for rotation therewith.

A retaining disc 276 which has a screw portion extending from the center thereof, is threaded into the left hand end of the shaft 48 to rotate therewith. Between the left and right hand faces of the friction disc 274 and the retaining disc 276, respectively, is a friction member 277, such as a felt disc. A similar friction member 278 is situated between the friction disc 273 and the plate member 261. A spring 279 coiled about the collar 257, exerts a pressure against the plate member 257 and as the plate member 257 and the sleeve 264 are loosely mounted on the shaft 48, this pressure is transmitted to the retaining disc 276. As the retaining disc 276 and the plate member 257 rotate with the shaft 48, they will tend to rotate the cam sleeve 264 therewith through the action of the friction members 277 and 278. The stop-arm 266 is normally engaged as will be hereinafter described, and consequently prevents the cam sleeve 264 and its attached members from rotating. However when the stop-arm 266 is released, the cam sleeve 264 will rotate with the shaft 48.

*Selector mechanism*

In the selector mechanism two magnets are employed, a start magnet and a selector magnet. Referring to Figs. 1, 4, 6 and 17, the operation and arrangement of the start magnet unit will now be described. Secured adjacent the center of the left hand edge of the plate 33 by screws 281 is a start unit mounting bracket 282. Rotatably fixed in a circular opening in the bracket 282 is a circular plate 283, Fig. 4. Two clamping members 284, Figs. 4 and 6, and 286, Fig. 6, located on opposite sides of the plate 283, normally clamp the plate 283 to the bracket 282 by means of a thumb screw 287, Fig. 6, threaded in the clamping member 286. Attached by screws 288, Fig. 17, to the plate 283 is an angle bracket 289 upon which is mounted by a screw 291 a magnet yoke 292 and a start magnet 293. An armature bracket 294 secured to the yoke 292 by screws 296 has in the upper end thereof a rod 297 upon which is pivotally supported an armature 298. A retractile spring 299 attached to the left hand end of the armature 298 as seen in Fig. 17, tends to actuate the armature 298 to its retracted position. A bracket 300, Figs. 6 and 17, attached to the plate 283 has pivotally supported therein a spring adjusting screw 301. A cord 302 is attached to one end of the spring 299 and is adapted to wind about the adjusting screw 301 to vary the tension of the spring 299. A spring 303 coiled about the adjusting screw 301 exerts a pressure between a collar 304 on the screw 301 and the bracket 300 and thereby prevents the spring 299 from unwinding the cord 302 from around the screw 301. Pivoted on a stud 306 extending horizontally from the plate 283 is a bell-crank trip member 307 with two extending arms 308 and 309.

In the rest position of the machine, the rest impulse of the signaling code energizes the start magnet 293. This causes a hooked member 312 on the right hand end of the armature 298 to be engaged with the arm 308 of the trip member 307 as the stop-arm 266 engages the arm 309 of the trip member. Thus the rotation of the stop-arm 266 and the cam sleeve 264 is stopped and the described friction clutch will slip as long as the magnet 293 remains energized. When the stop-arm 266 and the trip member 307 are not engaged, a spring 311 rocks the trip member 307 to bring the arm 308 against a stop pin 313 whereupon the arm 309 will be in the path of the stop-arm.

The operation and arrangement of the selector unit will now be described. Referring to Figs. 1, 2, 6, 18 and 26, an inverted U-shaped selector unit mounting bracket 314 is adjustably secured to the left hand front corner of the plate 33 by screws 316 extending through slotted holes 315 in the bracket 314. Screws 317 and 318 located in either side of the bracket 314 have pivotally mounted on shoulders thereof a substantially U-shaped selector magnet cradle 319. Attached to the lower section of the cradle 319 by screws 321 is a magnet yoke 322 and two electromagnetic coils 323. These coils 323 comprise what will be hereinafter referred to as the selector magnet. The inner ends of the screws 317 and 318 support a rod 324 therebetween upon which is pivotally mounted an armature 326. Rigidly secured to the armature 326 is a member 327 in operative relation with the pole pieces of the magnets 323. Sections 328 and 329 of the armature extend toward the rear of the machine, the purpose of which will be hereinafter described. An adjusting bracket 331 secured to the mounting bracket 314 has secured therein a screw 332 extending toward the front of the machine. The screw 332 extends through an elongated hole 333 in a vertical depending section 334 of the cradle 319 and has a thumb nut 336 in threaded engagement therewith. A spring 337 coiled about the screw 332, holds the section 334 of the cradle 319 against the thumb nut 336. Thus it is evident that by changing the adjustment of the thumb nut 336, the position of the magnets 323 relative to the armature 326 is varied. A rod 338 pivotally supported in the adjusting bracket 331 has a thumb nut 339 secured to one end thereof. A spring 341 is coiled about the rod 338 and frictionally prevents the rod from turning. A cord 342 has one end attached to the rod 338 and is adapted to wind thereabout to vary the tension of a spring 343 which is attached to the armature extension 328. Two adjustable screws 344 and 346 in the top of the mounting bracket 314 limit the throw of the armature 326.

Referring to Figs 6, 7 and 16, the plate 33 has attached adjacent the front center thereof an elongated inverted U-shaped bracket member 347. A selector lever mounting plate 348 is adjustably secured to the left hand side of the bracket 347 by screw (not shown) extending through clearance holes in the plate 348. Extending horizontally from the plate 348 are three studs 349, 351, and 352, shown in section in Fig. 18. On the studs 349, 351 and 352 are a series of six selector lever guide members 354, Fig. 18, mounted one behind the other. The guide members 354, Fig. 18, are separated by spacers 353, Fig. 18, on the mounting studs. The spacers 353 and guide members 354 are all clamped together and on the studs 349, 351 and 352 by nuts such as 355, Fig. 6, in threaded engagement with the studs. Intermediate with the guide members 354 are a group of five selector levers indicated in general at 356, Fig. 18, and individually by reference numerals 356a to 356e in Fig. 6. The spacers 353 on the stud 351 serve as bushings for the selector levers 356 and as they are slightly thicker than the selector levers, the selector levers are movable between the guide members 354. As seen in Fig. 18, individual springs 357 attached to each selector lever 356, tends to rock it in a counter clockwise direction and keeps the end of a rightwardly extending arm 358 thereof in engagement with the circumference of an associated selector cam 267. Each of the five selector levers 356a to 356e has one of the five selector cams 267a to 267e, respectively, associated therewith. Each selector lever 356a to 356e also has a leftwardly extending projection 359a to 359e which is adapted to operatively engage with, as will be hereinafter described, an associated selector bar latch indicated in general at 361 in Fig. 6 and individually by reference numerals 361a to 361e in Figs. 18 and 27. A stud 362 extending vertically from the bracket 347 has a series of bushings 363 thereon upon which the selector bar latches 361 are pivotally mounted between spacers 364. Individual springs 366 attached to an arm of the latches 361, tend to rotate them in a clockwise direction as seen in Fig. 6.

Referring now to Figs. 6, 7 and 16, two vertical studs 367 and 368 in the bracket 347 have thereon a series of bushings 369 and spacers 371. On the bushings 369 are a series of five selector bars indicated in general at 372 in Figs. 6 and 7 and individually by reference characters 372a to 372e in Fig. 16. Each selector bar 372 has elongated slots 373 therein and are thereby adapted to slide transversely of the machine. Their normal position is to the right and they are held there by the selector bar latches 361 being latched in notches 374 in each selector bar. Each selector bar 372 has an associated selector bar latch 361 in operative relation therewith. Five single wire springs 376 have one end of each engaged in a V-shaped groove in the right hand end of each selector bar 372. The other ends of each spring 376 is in a hole in a block 377. The block 377 is attached to a vertical flange 378 of the bracket 347 by screws 379 and by changing the adjustment of the screws 379, the tension of the springs 376 tending to slide the selector bars 372 to the left is varied. Each of the selector bars 372 has formed on the front edge a series of notches 380. As is well known to those versed in the art, these notches 380 are arranged according to a predetermined code arrangement and each selector bar 372 has a different arrangement of notches therein.

The operation of the selector mechanism in conjunction with the receipt of a code combination of line conditions as transmitted by the transmitting mechanism will now be described. It will be assumed that the combinations of line conditions to be received are similar to those transmitted in the described cycle of operation of the transmitting mechanism. This group of line conditions represented the letter M and was composed of a spacing start impulse followed by two more spacing impulses, then three marking impulses which in turn were followed by a marking rest impulse.

As stated, when the transmitting mechanism is at rest, a marking rest impulse is continuously sent to the line. Referring to the circuit diagram, Fig. 28, the start magnet 293 and the selector magnet 323 are in series with the line and will, therefore, be energized by the rest impulse. On the receipt of the start impulse, both the start magnet 293, Fig. 17, and the selector magnet 323, Fig. 18, will be deenergized, which allows their armatures 298 and 326 respectively, to be moved into their retracted positions by their attached springs. As the start magnet armature 298 moves to its retracted position, the hooked member 312 attached thereto unlatches the arm 308 of the trip member 307. Thereupon the stop-arm 266 tending to rotate by means of the hereinbefore described friction clutch, will rotate, and in so doing, rock the trip member 307 so that the stop-arm 266 and the arm 309 of the trip member are disengaged. The spring 311 then rocks the trip member 307 to bring the arm 308 against the stop pin 313. As described, the stop-arm 266 is secured to the cam sleeve 264 and therefore it and its attached members will rotate with the stop-arm.

Figure 30:
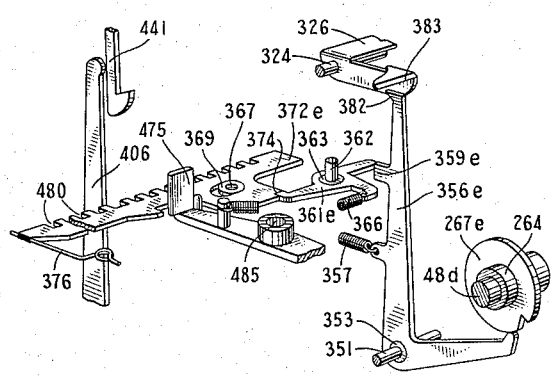
Fig. 30 is a perspective view showing one of each of the elements of the selector mechanism.

In the preferred embodiment of this invention, the shaft 48 and the transmitting shaft 71, Fig. 8, are arranged to rotate at the same speed, and as described, the start impulse and the following five intelligence impulses are each equal to about one-seventh of the revolution of the transmitting shaft 71. After the selector cam sleeve 264, Fig. 18, has rotated about three-fourteenths of a revolution from its rest position, a notch 381 in the selector cam 267a comes into operative relation with the end of the rightwardly extending arm 358 of the selector lever 356a. Thereupon, the attached spring 357 is allowed to rock the selector lever in a counterclockwise direction as seen in Fig. 18. Whether or not the spring 357 is allowed to rock the selector lever 356a to the full depth of the notch 381 is determined by the position of the selector magnet armature 326. If the armature 326 is in its spacing or retracted position, a bevelled portion 382 on the end of the selector lever 356a engages with a bevelled baffle section 383 of the armature extension 329. This prevents further rocking of the selector lever 356a and also prevents any movement of the armature 326 while the two bevelled surfaces are engaged. The notch 381 in passing out of engagement with the end of the arm 358, rocks the selector lever 356a clockwise to its normal position. This disengages the bevelled surfaces 382 and 383 and thus allows the armature 326 to be positioned in accordance with the next received intelligence impulse. Had the armature 326 been in its energized position, as shown, the spring 357 would have rocked the selector lever 356a beneath the baffle section 383, thus also preventing further movement of the baffle section as the arm 358 moves to the full depth of the notch 381 in the cam 267a. As hereinbefore stated, the selector unit mounting bracket 314 is adjustable and consequently the baffle section 383 carried thereby is adjustable relative to the selector levers 356. Thus the length of the time that a selector lever 356 prevents the operation of the baffle section 383 is varied. For a clearer conception of the operation of the selector mechanism in conjunction with the following, reference is made to Fig. 30 which shows perspectively the arrangement of one of each of the elements of the selector mechanism. The selector lever 356a in rocking to the full depth of the notch 381 would allow the projection 359a thereon to engage the end of its associated selector bar latch 361a. The selector bar latch 361a would in turn be rocked counterclockwise as seen in Fig. 6, and cause the disengagement of the right hand end and the notch 374 on the selector bar 372a. Thereupon, the associated spring 376, Fig. 7, would slide the selector bar 372a from its normal spacing position to the left into its marking position. Thus the position of the armature 326 when the selector lever 356a enters the notch 381 in its associated selector cam 267a determines the position of the associated selector bar 372a. In the same manner, the selector cams 267b to 267e sequentially allow their associated selector levers 356b to 356e to rock and cause their associated selector bars 372b to 372e to be selectively positioned.

The orientation or rotatable adjustment of the start magnet unit comprising the plate 283, attached magnet 293 and stop lever 307, relative to the stop-arm 266 compensates for variations in the length of the start impulse and permits the adjustment thereof whereby the first selector lever 356a is operable through its cycle of operation during a predetermined portion of the first selecting interval of the signal. Thus the time at which the baffle section 383 prevents or allows the full operation of a selector lever 356 relative to the beginning and ending of an associated selecting interval is determined by the orientation of the start magnet and its associated members. As hereinbefore mentioned, the selector cam shaft 48 and the transmitting shaft 71 are arranged to rotate at the same speed, and the cams 173a to 173e and 267a to 267e have the same angular displacement. Therefore, the selector levers 356 are operated during corresponding portions of their associated selecting intervals. The outer end of the clamping member 284 serves as a pointer, passing over a scale on the face of the bracket 282, whereby the extent of orientation can be gauged. The notches 381 in the cams 267b to 267e are so arranged relative to their speed of rotation and the length of the selecting intervals that they actuate their associated selector levers 356b to 356e during substantially the mid-portions of their respective selecting intervals. Thus the five selector bars 372 are selectively positioned in accordance with five selecting intervals of the signal. As it was assumed that selecting impulses representative of the character M was received on the selecting magnet, the impulses being spacing, spacing, marking, marking and marking, the selector bars 372a and 372b will be left in their normal or spacing position, and the selector bars 372c to 372e moved to the right into their marking position.

As hereinbefore described in the description of the transmitting mechanism, the transmission of a start impulse is initiated concomitantly with the release of the transmitting shaft 71. The start impulse in turn causes the release of the selector cam sleeve 264 which will thereupon rotate at the same speed as the transmitting shaft 71. As described, the transmitting shaft 71 transmits a rest impulse during the last part of its revolution and is invariably stopped in its rest position after each revolution. The speed of the selector cam sleeve 264 being the same as that of the transmitting shaft 71, it will complete a revolution during the transmission of the marking rest impulse. The rest impulse energizes the magnet 293 and therefore, by means of the armature 298 and trip member 307, the cam sleeve 264 is invariably brought to rest in its normal rest position after each revolution.

*Printing mechanisms*

After the previously mentioned cam sleeve 264, Fig. 15, has made about two-thirds of a revolution, the start cam 268 engages an arm 384' of a clutch release member 384 and, as seen in Fig. 19, causes the release member 384 to pivot in a clockwise direction. The release member 384 is pivotally mounted on a rod 386 supported in a bracket 387 which in turn is secured to the plate 33. Two collars 388 and 389, secured to the rod 386, prevent the release member 384 from moving longitudinally on the rod. As seen in Fig. 15, the left hand end of the rod 386 is threaded into the bracket 387 and locked in place by a lock nut 391. Referring to Figs. 15 and 19, the top end of an arm 392 of the release member 384 is normally engaged with a side cam surface 393 formed on the collar 249 and thus holds the collar 249 to the right and its teeth 253 out of engagement with the teeth 254 on the disc member 256. When the release member 384 is rocked by the start cam 268, the end of the arm 392 and the side cam surface 393 are disengaged, whereupon a spring 394 coiled about the collar 247, forces the collar to the left and causes the teeth 253 thereon to engage with the teeth 254 on the constantly rotating disc member 256. Thereupon the collar 249 will rotate with the disc member 256 and as the sleeve 241 with its attached members are rotatably engaged with the collar 249 as hereinbefore described, they will also rotate with the disc member 256.

After being tripped by the start cam 268, a spring 385 returns the clutch release member 384 to its normal position, whereupon the end of the arm 392 rides on the circumference of the collar 249 and in the path of the side cam surface 393. Thus, as the collar 249 completes a revolution, the side cam surface 393 and the end of the arm 392 engage and cause the disengagement of the teeth 253 and 254 on the collar 249 and the disc member 256 respectively. A further projection of the side cam surface 393 then engages the end of the arm 392 and stops the rotation of the collar in its normal predetermined rest position. In this position a hooked latch arm 390 is adapted to engage a cam surface 395 extending radially from the face of the drop-in-cam 248 and thus prevent rebound or rotation in a reverse direction of the sleeve 241 and its attached members due to their sudden stop by the side cam surface 393 and the arm 392.

Figure 29:
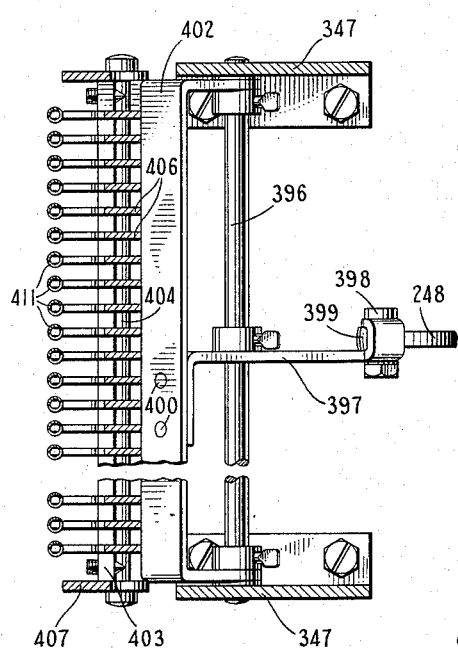
Fig. 29 is a fragmentary sectional view taken approximately on line 29—29 of Fig. 16.

Pivoted in the upright sections of the bracket member 347 is a rod 396, Figs. 16, 21 and 29. Secured adjacent the center of the rod 396 is a web member 397. A shoulder screw 398, Figs. 6 and 16, carried in the web member, has pivoted thereon a roller cam follower 399 in operative relation with the drop-in-cam 248. A spring 401 attached to the web member 397 keeps the cam follower 399 engaged with the cam 248. A U-shaped drop-in-bar bail 402 has the ends secured to the rod 396 by hobs, not shown, and the center part secured to the web member 397 by screws 400 (Fig. 21). Thus, as the cam follower 399 follows the contour of the drop-in-cam 248, the drop-in-bar bail 402 will rock back and forth for each revolution of the drop-in-cam.

Secured to the base plate 33 in front of the bracket member 347 is a block 403. Pivotally mounted on a rod 404 secured in the block 403 and guided in slots therein are a series of drop-in-bars 406. Attached to each end of the block 403 are brackets 407, Figs. 6 and 7, which support a spring mounting bar 408. Each of the drop-in-bars 406 have a horizontal arm 409 to which is attached one end of an individual associated spring 411. The other ends of the springs 411 are secured in the spring mounting bar 408. With the drop-in-cam 248 in its normal position, the drop-in-bar bail 402 is adapted to be in contact with each drop-in-bar and hold them out of engagement with the selector bars 372a to 372e. As is familiar to those versed in the art, the selector bars 372 have the notches 380 so formed therein that for each combination of settings, with exceptions that will be hereinafter described, a single row of notches in the bars 372 will be in alignment.

After the drop-in-cam 248 has rotated about ninety degrees from its rest position, the cam follower 399 enters the depression in the cam 248, by action of the spring 401, and thus rocks the web member 397 and the attached drop-in-bar bail 402 clockwise as seen in Fig. 16. This in turn allows the springs 411 to rock the drop-in-bars 406 against the selector bars 372. This action is timed to take place after the selective positioning of the selector bars 372, and as a row of notches therein are in alignment, as heretofore described, one of the drop-in-bars 406 will be allowed to rock further than the others. Thus one of the drop-in-bars 406 is selectively actuated and the manner in which this drop-in-bar controls the printing mechanism will be described in following paragraphs.

Rigidly secured to the top of two posts 412 and 413, Fig. 4, extending vertically from the plate 33 is an angle member 414. A similar angle member 416, Fig. 3, is supported by a post 417 and a bracket 418. The angle members 414 and 416 comprise the supporting means for the printing unit and by removing screws 419 in the posts and bracket, the complete printing unit may be readily lifted from the rest of the machine. The frame of the printing unit comprises two vertical plate members 421 and 422, Figs. 1, 3 and 4, with suitable connecting members which will be hereinafter described. The plate members 421 and 422 are secured to the angle members 414 and 416, respectively, by screws 423 and 424. Secured in a vertical position to the front of the plates 421 and 422 and extending therebetween is a print keylever comb plate 426. Secured to the front of the print keylever comb plate 426 by screws 420 (Figs. 21 and 24) is a drop-in-bar comb plate 427 which serves to guide the upper ends of drop-in-bars 406. Attached to the rear of the plates 421 and 422 is a keylever pivot plate 428. The pivot plate 428 is shown in section in Figs. 21 and 24 and has attached to the front and rear sides respectively, a slotted plate 429, and a keylever retaining plate 431. A series of printer keylevers mounted side by side in the slots in the plate 429 are indicated at 432 in Fig. 21 and have a notch in the right hand end which engages with the pivot plate 428. The printer keylevers 432 are held engaged with the pivot plate 428 and in their normal position by individual compression springs 433. The springs 433 are mounted on pins 434 supported in a channel member 436 extending between the plate members 421 and 422. Projections 437 on each keylever 432 keep the springs in place and engaged with their associated keylevers. As seen in Fig. 21, the left end of the printer keylevers 432 are guided in slots in the printer keylever comb plate 426. A member 438 extending across the top of the comb plate 426 limits the upward movement of the printer keylevers 432. Adjacent the left hand end of each keylever 432 is a pin 439 upon which is pivotally hung an associated hook member 441. Springs 442 individual to each hook 441 and keylever 432 keep the hooks against a stop bar 443 secured to the drop-in-bar comb plate 427. A block 444 extends between the plates 421 and 422 and has a series of slots in the front section thereof in which are guided a series of bell-cranks 446. The bell-cranks 446 are pivotally mounted on a rod 447 carried in the block 444. Each bell-crank 446 is operatively engaged with an associated keylever by a pin 448 carried in the keylever which engages a slot 449 in the bell-crank.

Referring now to Fig. 1, a cast member 451 supported between the plates 421 and 422, has secured thereto a segment 452 in which are a series of radial slots. In the slots are a series of typebars 453 which are adapted to pivot on a rod 454, Fig. 21, in the segment 452. A link 455 operatively connects each typebar to an associated bell-crank 446. Normally, the typebars 453 rest on a padded segment 456 supported on a segmental member 457 extending between the side plates 421 and 422. Obviously, other typebar construction can be employed, if desired.

Figure 31:
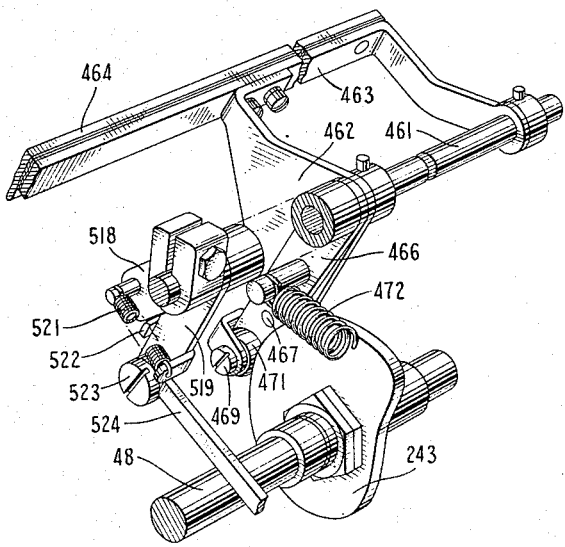
Fig. 31 is a perspective view showing a portion of the print and line feed mechanisms.

The manner in which a typebar is actuated will now be described and referring to Figs. 3 and 4, bushings 458 and 459 supported in the angle members 414 and 416, respectively, pivotally support a print bail shaft 461. Secured to the shaft 461 is a print bail web 462, Figs. 21 and 31, which has attached to an arm thereof a print bail 463. The print bail 463 is U-shaped and has the ends thereof secured to the print bail shaft 461 for rotation therewith. Secured by screws to the front side of the print bail 463 is a print bail striking plate 464. On the print bail shaft 461 is a print lever 466 which is adjustably connected to the print bail web 462 by a screw 467 threaded into the print lever and extending through an elongated hole 468 in the web 462. Carried in the lower end of the print lever 466 is a shoulder screw 469 which in turn pivotally carries a roller cam follower 471. The cam follower 471 is held engaged with the print cam 243 by a retractile spring 472, one end of which is attached to the lever 466, the other end being adjustably mounted as will be hereinafter described, to vary the tension of the spring 472.

As described, when one of the drop-in-bars 406 is allowed to enter a row of aligned notches 380 in the selector bars 372, the upper end engages the back side of an associated hook 441 and pushes this hook under the print bail striking plate 464. As the cam follower 471 subsequently enters the depression in the print cam 243 by action of the spring 472, the print bail 463 moves downwardly and causes the striking plate 464 to engage with the actuated hook 441. This pulls the hook downwardly and causes the associated printer keylever 432 to be actuated, which in turn causes the actuation of the associated typebar 453. As a typebar is actuated, the printing of the character thereon is effected on a paper blank supported on a platen 473.

Adapted to be operated by the cam surface 395 on the cam 248 and in timed relation with the operation of the drop-in-bar 402 and the print bail 464 is a selector bar reset lever 475, Fig. 6. The reset lever 475 is pivoted on a screw 485 in the bracket 347 and when operated engages projections 490 on the selected selector bars 372 and moves said bars to the right into their normal position where they are latched by their associated selector bar latches 361.

*Platen shift and unshift*

The typebars 453 carry two sets of type and to effect the printing of either set the platen 473 is raised and lowered in response to shift and unshift signals, respectively, as will be hereinafter described. Referring to Figs. 3, 4 and 24, a shaft 474 is pivoted in bushings 476 and 477 in the printing unit mounting plates 421 and 422. Secured adjacent each end of the shaft 474 are levers 478 and 479 which comprise one arm of parallelogram mechanisms located at each end plate used to shift the platen carriage up and down in a straight line. Levers 481 and 482 pivoted at 483 and 484 in the frame plates 421 and 422, respectively, comprise a second arm of the parallelogram mechanisms. Thus the shaft 474 and the pivots 483 and 484 serve as the fixed pivot points of the parallelogram mechanisms. The parallelogram mechanisms at the left hand side of the machine is shown in Fig. 24 and referring thereto, a pin 486 and a screw 487 serve as the movable pivots of parallelogram. The pin 486 and screw 487 are carried in an end plate 488 and have the forward ends of the levers 478 and 481, respectively, pivoted thereon. In the same manner an end plate 489, Fig. 3, is supported at the right hand side of the machine on movable pivots 491 and 492 engaging with the forward ends of the levers 479 and 482, respectively.

Referring to Figs. 21 and 24, the plates 488 and 489 support a transverse plate 493 and two track members 494 and 496 which comprise a cradle for the platen carriage. Rollers 497 and 498 in the tracks 494 and 496 support the carriage for transverse movement. The carriage comprises a carriage main plate 499, two carriage end plates 501 and 502, Figs. 3 and 4, a platen 473, paper blank guides and various other members which will be hereinafter described. Thus the carriage is transversely movable on the rollers 497 and 498 and the means of moving the carriage to effect letter spacing and the manner in which a carriage biasing means is operable to return the carriage for the beginning of a new line will be hereinafter described.

The means of shifting the carriage in a substantially vertical plane to effect the printing of either sets of characters on the typebars will now be described. Let it be assumed that the carriage is in its lower position as limited by adjusting screws 503 and 504, Figs. 3 and 4, engaging the ends of the levers 478 and 479, respectively, and that a shift signal is received on the selector magnet. As described, the selector bars are selectively positioned in response to a received signal and a drop-in-bar 406, Figs. 21 and 24, is selectively actuated. For the shift signals a drop-in-bar 406 associated with the hook 441 attached to a shift lever 506 is selected. The lever 506 is pivoted on a shoulder screw 507 which is supported on a bracket 508 extending downward from the cast connecting member 451, Fig. 1. As the striking plate 464, Figs. 21 and 24, engages the hook 441 and rocks the shift lever 506, the rear end thereof engages a member 509 secured to the connecting plate 493 and causes the plate 493 to rise. This in turn by means of the described parallelogram mechanisms raises the cradle and the carriage. When the carriage reaches its high position, as limited by the adjusting screws 511 and 512, Figs. 3 and 4, engaging the levers 478 and 479, a spring 513, Fig. 24, pulls a latch member 514 pivoted at 516 under an extension of the pin 486 and thus holds the carriage in its high position. When an unshift signal is received, a hook 441 is selected, which has the bell-crank 461a associated therewith. The bell-crank 461a is connected by a member 517 to the latch member 514 and when actuated, pulls the latch member 514 out of engagement with the pin 486. Thereupon the weight of the carriage and its associated cradle causes it to return to its lower position.

Letter spacing

A description of the elements comprising the letter spacing mechanism and the operation thereof will now be given in detail. As described, the print bail shaft 461, Figs. 21 and 31, rocks for every revolution of the print cam 243 and secured adjacent the center of the shaft is a lever 518. Pivoted on the shaft 461 adjacent the lever 518 is another lever 519. A spring 521 normally holds a projection 522 on the lever 519 against the lever 518. On a shoulder screw 523 in the end of the lever 519 is pivoted a link 524. Thus the link 524 is adapted to slide back and forth with every revolution of the print cam 243, and as hereinafter described, operates a letter spacing mechanism.

Referring now to Figs. 6 and 21, a spacing mechanism bracket 526 is secured to the plate 33 and has therein a bushing 527. A guide member 528 secured to the bracket 526 guides the upper end of a shaft 529, the lower end of which is journaled in the bushing 527. Secured adjacent the lower end of the shaft 529 for rotation therewith is a sleeve 531 which has a ratchet 532 formed on a flange thereof. A plate 533 is loosely mounted on the sleeve 531 and held in place by a collar 534, secured to the sleeve 531. A pawl 536, pivoted on a screw 537 in the plate 533, is held operatively engaged with the ratchet 532 by a spring 538. Another pawl 539 which serves as a retaining pawl is pivoted on a screw 541 in the bracket 526 and held operatively engaged with the ratchet 532 by a spring 542. A spring 540 normally holds a bell-crank 543 pivoted on a screw 544 in the bracket 526 engaged with a projection 546 on the plate 533 and thereby prevents a spring 547 from rotating the plate in a counter clockwise direction.

A bail 548 pivoted on a rod 549 supported from the channel member 436 extends beneath the printer keylevers 432 and has a downwardly extending trip arm 551 attached thereto. Whenever a printer keylever 432 is actuated, the bail 548 is rocked and causes the trip arm 551 to engage the bell-crank 543 and causes it to disengage with the projection 546 of the plate 533. At the time that the bell-crank 543 is actuated, the roller 471 is entering the depression in the print cam 243 and therefore the link 524 is moving toward the rear of the machine. The actuation of the bell-crank 543 thus allows the spring 547 to rotate the plate 533 in a counter clockwise direction, as seen in Fig. 6, and brings a projection 552 of the plate 533 in contact with the hook 553 on the end of the link 524. The movement of the hook 553 toward the rear is sufficient to allow the pawl 536 carried by the plate 533 to engage the next tooth on the ratchet 532 and as the hook 553 is subsequently returned to its normal position, the pawl 536 engages this tooth and rotates the shaft 529 an amount equal to one tooth on the ratchet 532. By the time the plate 533 has returned to normal, a spring, not shown, has returned the bail 548 and trip arm 551 to normal and thus allows the bell-crank 543 to again lock the plate in its normal position. Thus the shaft 529 is rotated one tooth of the ratchet 532 for every operation of a printer keylever. The bail 548 has notches therein under predetermined of the printer keylevers 432 and consequently when these keylevers are selected, the bail 548 is not actuated to cause the trip arm 551 to trip the bell-crank 543. As is evident from Fig. 21, some of the other printer keylevers, such as 506, 566 and 567, when selected, do not actuate the bail 548. Therefore, as these keylevers are selected, the trip arm 551 does not trip the bell-crank 543, and consequently the hook 553 does not operatively engage the projection 552 of the plate 533 to rotate the shaft 529 as it does when one of the other printer keylevers is selected. The keylevers that do not actuate the bail 548 are associated with printer function signals and consequently, the shaft 529 is not rotated on such signals and no letter spacing occurs.

As seen in Figs. 3, 4 and 5, shoulder screws 554 and 556 in the platen supporting end plates 501 and 502 have pivoted thereon two members 557 and 558. Extending between the members 557 and 558 is a plate 559 which has a rack 561 secured thereto. Springs 562 and 563 on the screws 554 and 556 tend to rotate the plate 559 in a clockwise direction, as seen in Fig. 4, and hold the rack 561 engaged with a pinion 564 secured to the upper end of the shaft 529. Thus, as the shaft 529 is rotated in a clockwise direction, as seen in Fig. 6, the pinion 564 engaging the rack 561 moves the carriage and its attached members to the left an amount equal to one letter space for each character printed, against the biasing action of the carriage biasing means, not shown.

Carriage return

The carriage is returned to its right hand position on the receipt of a carriage return signal. This signal is such that it causes the selection of a drop-in-bar 406 associated with a hook 441 on the forward end of a carriage return lever 566, Fig. 21, the same as the selection of any printer keylever 432. Only the right hand section of the carriage return lever 566 is shown in Fig. 21, the left hand section being similar to the left hand section of a hereinafter described line feed lever 567. The lever 566 is pivoted on a shaft 568 which in turn is journaled in the angle members 414 and 416, Figs. 3 and 4. The right hand end of the lever 566, Fig. 21, is adjustably connected to another lever 569 on the shaft 568 and adapted to rock therewith by a screw 571 threaded in the lever 569 and extending through a slot 572 in the lever 566. The upper end of the lever 569 carries a shoulder screw 573 upon which is pivotally mounted a roller 574. The roller 574 is engaged with the plate 559 and allows the rack 561 thereon to be engaged with the pinion 564. When a signal is such as to allow the hook 441 on the forward end of the carriage return lever 566 to be engaged with the print bail striking plate 464, the lever 566 is rocked and consequently causes the roller 574 to rock the plate 559 in a clockwise direction. This causes the disengagement of the rack 561 and pinion 564 and therefore renders the carriage biasing means operable to return the carriage to the right for the beginning of a new line.

As a longer length of time is required to return the carriage to its initial position than the length of time that the carriage return lever 566 is operated, the plate 559 and rack 561 are latched in their operated position during the returning of the carriage. This is accomplished by a latch member 576 pivoted on a screw 577 supported by a bracket 578 secured to a connecting bar 579 in the carriage. A spring 581, Fig. 23, causes the latch member 576 to engage with a stop 582 when the plate 559 is actuated, and thus hold the plate in its operated position which retains the rack 561 out of engagement with the pinion 564. When the carriage reaches its extreme right hand position, it being stopped as hereinafter described, an arm 583, Fig. 5, secured to the printer frame, trips the latch member 576 and thereupon the springs 562 and 563 rock the plate 559 to bring the rack 561 again into engagement with the pinion 564.

An arm 584 secured to the carriage is adapted to engage a plunger 586 of a dashpot 587, and check the momentum of the carriage and bring it to rest gently at its right hand position. The dashpot plunger 586 is reset by the subsequent motion of the carriage by means of a double spring 588 which engages with the enlarged head of the plunger 586.

Line spacing

Line spacing is effected on the receipt of a line feed signal which allows the selection of a drop-in-bar 406, Fig. 21, associated with the hook 441 on the left hand end of the line feed lever 567. The line feed lever 567 is supported on the shaft 568 and is adjustably secured to an arm 587 of a line feed bail 588. Therefore, as the line feed lever is actuated, the line feed bail 588 will rock in a counter-clockwise direction. A shoulder screw 589 in the connecting bar 579 in the carriage pivotally supports a bell-crank 591, Figs. 21, 22 and 24. In one end of the bell-crank 591 is a shoulder screw 592 which supports a roller 593 in operative relation with the line feed bail 588. Attached to the other end of the bell-crank 591 by a screw 594 is a pawl 596 adapted to engage with a ratchet 597 secured to the platen shaft 598. When the line feed bail 588 rocks the bell-crank 591, the pawl 596 engages a tooth on the ratchet 597 and rotates the platen 473. As the paper blank is frictionally held engaged with the platen, it will be advanced as the platen rotates.

It will be noted in Figs. 21 and 24 that some of the hooks 441 are shorter than the others and are therefore adapted to engage the striking plate 464 in their cycle of operation sooner than the longer hooks. Consequently, the shorter hooks will have greater motion and be capable of performing more work than the long hooks. The short hooks 441 are associated with some of the printer function levers and thus the spring 472 operates the striking plate 464 to apply the necessary motion to the hooks 441 and causes them to perform their respective functions. The tension of the spring 472 is adjusted by an adjusting screw 599 secured to one end thereof.

Bell signal

For various reasons it is desirous to have an audible signaling means on each machine. In this embodiment a bell is provided and the manner of ringing this bell will now be described. On the receipt of a certain signal combination, namely, the combination representing the letter J, two rows of notches in the selector bars 372 will be in alignment. These two rows of notches are associated with the drop-in-bars 406a and 406b, Fig. 20, and which of these bars will be selectively actuated is determined by the position of a plate 601. Referring to Figs. 2, 20 and 25, the plate 601 is supported beneath the comb plate 427 on studs 602 and is movable thereon by virture of the slots 603 in the plate. Pivoted in two brackets 604 and 606 on the angle member 416 is a rod 607 which has secured thereto a substantially horizontal arm 608 at the rear end and a substantially vertical arm 609 at the front end. Attached to the end of the arm 608 is a link 611 which has the upper end attached to a section of the carriage cradle that moves up and down in response to shift and unshift signals, respectively. Therefore, as the cradle moves up, the link 611 causes the rod 607 to rock, which in turn by means of the arm 609, causes the plate 601 to slide to the right as seen in Figs. 1 and 20 against the action of a biasing spring 612. On the receipt of an unshift signal, the printing unit is lowered and thus allows the spring 612 to move the plate to the left. When the plate 601 is to the left, a hooked section 613 thereof prevents the drop-in-bar 406b from being selectively actuated on the receipt of a signal representing the letter J. Similarly, with the plate 601 to the right, a hooked section 614 of the plate prevents the drop-in-bar 406a from being selectively actuated on the receipt of the same signal representing the letter J. Thus the position of the carriage determines which of the two drop-in-bars 406a and 406b will be selected on the receipt of the J signal, the drop-in-bar 406a being selectable on all J signals following an unshift signal and the drop-in-bar 406b being selectable on all J signals following a shift signal. The drop-in-bar 406a causes the actuation of the J typebar 453 as in the heretofore described operation of a typebar. The selection of the drop-in-bar 406b causes the actuation of a keylever 432, Fig. 25, and its associated bell-crank 616 through the operation of the printing bail, as has been described. The actuation of the bell-crank 616 causes a bell striker 617 thereon to strike the bell 618 which is secured to the frame of the printing unit.

It is obvious, of course, that various other modifications of the apparatus shown herein may be made without departing from the spirit or essential attributes of the invention, and it is desired, therefore, that only such limitations shall be placed thereon as are imposed by the prior art or are specifically set forth in the appended claims.

We claim:

1. The combination of a telegraph recorder, a set of permutation bars, a selector mechanism comprising a single electromagnet for selectively positioning said permutation bars, a series of type bars, a corresponding series of actuating bars connected thereto, a corresponding series of hooks pivotally connected to said actuating bars, a universal bail for operating said hooks, means including said permutation bars for selectively controlling the operative engagement of said bail with a hook and means for resetting said permutation bars during the operation of said hooks by said bail.

2. The combination of a to and fro movable printing platen, a cradle for guiding said platen in said to and fro movement and movable in a plane at an angle thereto, a printing bail, a shift lever pivoted intermediate its ends and having one end disposed beneath said cradle, a hook member depending from the opposite end of said shift lever, said hook member being normally out of engagement with said printing bail, selecting means to bring said hook member into the path of said bail and cam means controlling the operation of said bail in timed relation with the operation of said selecting means whereby to rock said shift lever to shift said cradle and platen for any position of the latter in its to and fro movement.

3. In a start-stop telegraph receiving printer, a series of notched selector bars, means including a single selecting magnet for operating said notched selector bars selectively to selectively align the notches thereof, a plurality of type actuating bars each having a hook member pivoted thereto, a universal operating bail for said hook members, intermediate bars movable into said aligned notches and engageable with said hook members to move the same into the path of said bail and means for operating said bail in timed relation to the movement of said intermediate bars to actuate said hook member and thereby to operate said type actuating bars.

4. The combination of a printing platen, a printing bail, means selectively actuated by said bail for shifting said platen to upper case position, a latch independent of said means for locking said platen in shifted position, an actuating member having a one way connection to said latch and means for selecting said member for actuation by said bail to unlatch said platen.

5. A printing telegraph machine comprising a paper carriage, selecting mechanism, a plurality of type bars, a plurality of type actuating, space, and function bars; carriage spacing mechanism, a printing bail structure for operating said type bar actuating, space and function bars; a bail engaged by said type actuating and space bars to condition said space mechanism for operation and means operated by said printing bail structure for actuating said spacing mechanism to advance the paper carriage.

6. In a printer the combination with printing devices and selecting devices and a blank carrier; of a rack pivotally carried by said blank carrier, a pinion normally engaged with said rack, means for rotating said pinion to effect letter spacing of said blank carrier intermittently with the operation of said printing device, a blank carrier biasing means and means selectively controlled by said selecting device whereby said rack is pivoted out of engagement with said pinion whereupon said blank carrier biasing means is operable to return said blank carrier to an initial position.

7. In combination in a telegraph receiver a platen carrier, means for biasing said carrier to an original position, a rack pivotally carried by said carrier, a pinion normally engaged with said rack and adapted to be rotated to effect letter spacing of said carrier against the action of said carriage biasing means, means responsive to predetermined of received signals to pivot said rack out of engagement with said pinion whereupon said carriage biasing means is effective, means whereby said rack is held out of engagement with said pinion during the return of said carriage to said original position, and means whereby said rack holding means is released upon the return of said carriage to said original position.

8. In combination in a telegraph recorder, a set of type bar mechanisms, means responsive to received signals for selecting a type bar mechanism for operation, a printing cam, means operated by said printing cam for operating selected of said type bar mechanisms, a movable carriage, a second means operated by said printing cam for advancing said carriage, and means operated by said type bar mechanism for controlling the operation of said carriage advancing means.

9. In combination in a telegraph recorder, a set of type bar levers, a set of printer function levers, individual hooks associated with said type bar levers and said printer function levers, means for selecting any one of said hooks, a striker bar for operatively engaging selected hooks, resilient means for operating said striker bar sequentially with the selection of any one of said hooks, and means whereby predetermined of said hooks are operable through a greater distance to impart greater movement to predetermined of said associated type bars and/or printer function levers.

10. The combination of a printing platen, a printing bail, means selectively actuated by said bail for shifting said platen to upper case position, a latch independent of said means for locking said platen in shifted position, a latch controlling lever, a link connected to said lever and having a one way connection to said latch, a hook member depending from said lever and normally disposed out of engagement with said printing bail, selecting means to bring said hook member into the path of said bail whereby to rock said lever to unlatch said platen.

11. A printing telegraph machine comprising a paper carriage, a letter spacing mechanism therefor comprising a spacing ratchet, a spacing pawl, a pivoted member carrying said pawl, said member being spring biased in one direction, operating means for said member, an operating cam for actuating said operating means, a pivoted latch normally spring pressed into engagement with said member, means actuated on predetermined operations of said operating cam to release said latch to cause said pawl to be positioned in a new tooth of said ratchet under action of said first mentioned springs and independently of said operating means, and means including said operating means for moving said member in the opposite direction to rotate said ratchet thereby to advance said carriage.

12. A printing telegraph machine comprising a paper carriage, selecting mechanism, a plurality of type bars, a plurality of type actuating, space and function bars; carriage spacing mechanism, a printing bail structure for operating said type bar actuating, space, and function bars; a bail extending beneath said type bar actuating, space, and function bars and engageable by said type bar actuating and space bars only to condition said spacing mechanism for operation and means operated by said bail structure for actuating said spacing mechanism to advance the paper carriage.

13. In combination in a telegraph recorder, a set of permutation bars, a selector mechanism comprising a single electro-magnet for selectively positioning said permutation bars, a series of type bars, a corresponding series of actuating bars connected thereto, a corresponding series of hooks pivotally connected to said actuating bars, a striker bar for operating said hooks, means for selectively controlling the operative engagement of said striker bar with a hook, an operating spring for said striker bar, an intermittently operating rotary cam for returning said striker bar to normal position and means for adjusting said striker bar operating spring.

14. In combination in a telegraph recorder, a set of notched permutation bars, a selector mechanism comprising a single electro-magnet for selectively positioning said permutation bars in combinations of settings representative of received line impulses, a series of type bars, a corresponding series of actuating bars connected thereto, a corresponding series of hooks connected to said actuating bars, a striker bar for operating said hooks and a set of operating bars for said hooks cooperating directly with notches in said permutation bars for selectively controlling the operative engagement of said striker bar with a hook.

15. In combination in a telegraph receiver, a movable carriage, a set of type bars, a set of associated hooks, individual interconnecting means between said hooks and type bars, a bail to operate said hooks, means for selectively controlling the operative engagement of said hooks and said bail, a spring for operating said bail, an intermittently operating cam for returning said bail to normal position, and means operated by said cam to effect letter spacing of said carriage.

16. In combination in a telegraph receiver, a printing mechanism, a transversely movable carriage, resilient means for operating said printing mechanism, power operated means for returning said resilient means to normal, means for biasing said carriage to an initial position, and means whereby said power operated means advances said carriage against the action of said biasing means sequentially with the operation of said printing mechanism and concomitantly with the return of said resilient means to normal.

17. In combination in a telegraph receiver, a series of notched permutation bars, means responsive to received signals for selectively positioning said bars to bring certain of said notches into selective alignment, selectable elements selected by movement into said aligned notches, means whereby two rows of notches in said bars are in alignment for a predetermined setting thereof, a carriage movable longitudinally to effect letter spacing and movable in a substantially vertical direction to effect printing of upper and lower case characters and means controlled by the vertical position of said carriage for determining into which one of said two rows of notches a selectable element will be allowed to enter.

18. In combination in a telegraph receiver, a series of notched permutation bars, means responsive to received signals to bring certain of said notches into selective alignment, selectable elements selected by movement into said aligned notches, means for aligning two rows of notches in said bars in response to a predetermined signal, means for controlling the selection of either one of said selectable elements associated with said two rows of notches, a platen movable in a substantially vertical plane in response to predetermined signals to effect the printing of upper and lower case characters and means controlled by the vertical position of said platen for controlling said last mentioned means.

19. In combination in a telegraph receiver, a set of notched selecting members having a normal and a selected position, means comprising a single electro-magnet for selectively setting said selecting members to bring certain of said notches therein into selective alignment, selectable elements selected by movement into said aligned notches, individual resilient means for forcing said elements into said aligned notches, a retaining member common to all of said elements for normally keeping said elements away from said selecting members, a series of hooks equal in number to said selectable elements and associated therewith, an operating bar for said hooks, a recording mechanism selectively controlled by said hooks, a rotatable member rotating in timed relation to the positioning of said selecting members, means controlled by said rotatable member for actuating said retaining member whereby said elements are allowed to approach said selecting members whereupon one of said elements is selected to control the engagement of an associated hook and said operating bar, said operating bar being subsequently operated by said rotatable member and means operable by said rotatable member after the engagement of said operating bar and a hook to disengage said selectable elements from said selecting members and subsequently thereafter return selected of said selecting members to normal.

20. In combination in a telegraph receiver, a set of type bars having two sets of characters thereon, a platen carrier adapted to be set in one or the other of two positions to effect the printing of one or the other of said two sets of characters on said type bars, said carrier being biased to one of said two positions by means of the weight thereof, a lever, selectively operable means to actuate said lever to change the setting of said platen carrier from said biased position to said unbiased position, a latch for latching said platen carrier in said unbiased position and selectively operable means to actuate said latch whereby said platen carrier is returned to its biased position.

21. In combination in a telegraph receiver, a printing mechanism, a carriage having a shift and an unshift position, means responsive to shift and unshift signals for respectively positioning said carriage and means controlled by the position of said carriage whereby with the carriage in one of said positions, the receipt of a predetermined signal selectively operates said printing mechanism and with the carriage in the other of said positions said predetermined signal causes a printer function to be performed.

PAUL A. NOXON.
SAMUEL W. ROTHERMEL.
FRANK J. MAUS.
EMERSON J. SORTORE.